(12) United States Patent
Tolle

(10) Patent No.: US 10,008,084 B2
(45) Date of Patent: *Jun. 26, 2018

(54) WEARABLE, NON-VISIBLE IDENTIFICATION DEVICE FOR FRIENDLY FORCE IDENTIFICATION AND INTRUDER DETECTION

(71) Applicant: James P Tolle, Gainesville, VA (US)

(72) Inventor: James P Tolle, Gainesville, VA (US)

(*) Notice: Subject to any disclaimer, the term of this patent is extended or adjusted under 35 U.S.C. 154(b) by 0 days. days.

This patent is subject to a terminal disclaimer.

(21) Appl. No.: 15/342,118

(22) Filed: Nov. 3, 2016

(65) Prior Publication Data

US 2017/0103632 A1 Apr. 13, 2017

Related U.S. Application Data

(63) Continuation-in-part of application No. 14/069,586, filed on Nov. 1, 2013, now Pat. No. 9,519,853.

(51) Int. Cl.
| | |
|---|---|
| *G08B 23/00* | (2006.01) |
| *G08B 13/24* | (2006.01) |
| *G07C 9/00* | (2006.01) |
| *G01S 17/74* | (2006.01) |
| *G06Q 10/00* | (2012.01) |
| *H04W 12/06* | (2009.01) |

(Continued)

(52) U.S. Cl.
CPC ......... *G08B 13/2454* (2013.01); *G01S 17/74* (2013.01); *G06Q 10/00* (2013.01); *G07C 9/00039* (2013.01); *H04W 12/06* (2013.01); *G06K 19/07758* (2013.01); *H04W 12/08* (2013.01); *Y02D 70/00* (2018.01); *Y02D 70/166* (2018.01); *Y02D 70/26* (2018.01)

(58) Field of Classification Search
CPC . G08B 13/2454; G01S 17/74; G07C 9/00039; G06K 19/07758
USPC .......................... 340/527, 5.53, 5.61; 342/45
See application file for complete search history.

(56) References Cited

U.S. PATENT DOCUMENTS

| | | | | |
|---|---|---|---|---|
| 5,966,226 A | * | 10/1999 | Gerber | F41G 3/2655 342/45 |
| 7,308,202 B2 | * | 12/2007 | Roes | F41G 3/2655 398/108 |

(Continued)

*Primary Examiner* — Jack K Wang

(57) ABSTRACT

A wearable, non-visible identification device provides reliable, tamper-proof, friendly-force identification and intruder detection. The device is integrated as a part of the wearer's uniform and includes a user input surface for periodic entry of a unit- or user-defined pass code. A timeout capability prevents the device and its identification signal from being used if the pass code is not entered within the specified time period. The preferred embodiment uses non-visible optical identification signals for 1-way identification using standard tactical equipment, making the device useful in the field during operations or at temporary security control points away from established bases. Alternative embodiments use radio-frequency, visible and reflective identification signals. Identification signaling methods are effective at stand off ranges to minimize threat to security personnel. Very low cost and low power embodiments for use by security forces in developing nations are described. This invention provides a novel and improved means for defeat of the threat of adversaries or insurgents exploiting stolen or fake uniforms to attack friendly forces.

39 Claims, 8 Drawing Sheets

(51) Int. Cl.
  *G05B 23/00*   (2006.01)
  *G05B 19/00*   (2006.01)
  *G08B 13/00*   (2006.01)
  *H04B 10/00*   (2013.01)
  *G06K 19/077*  (2006.01)
  *H04W 12/08*   (2009.01)

(56) References Cited

U.S. PATENT DOCUMENTS

| | | | |
|---|---|---|---|
| 8,184,981 B2 * | 5/2012 | Ivtsenkov | A61B 5/6814 |
| | | | 342/45 |
| 9,846,235 B2 * | 12/2017 | Aharoni | G01S 17/74 |
| 2015/0339870 A1 * | 11/2015 | Cojocaru | G07C 9/00039 |
| | | | 340/5.53 |
| 2015/0379791 A1 * | 12/2015 | Russell | G07C 9/00031 |
| | | | 340/5.61 |

* cited by examiner (Front)

(Back)

WEARABLE, NON-VISIBLE IDENTIFICATION DEVICE FOR FRIENDLY FORCE IDENTIFICATION AND INTRUDER DETECTION

CROSS-REFERENCES TO RELATED APPLICATIONS

This application is a continuation in part of application Ser. No. 14/069,586 filed Nov. 1, 2013, the entire contents of which is hereby incorporated by reference in this application. This application claims the benefit of priority of the parent application for all claims which are not new matter.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. The following notice applies to all documentation described below and to all drawings accompanying and made part of this document: © 2016 James Tolle.

BACKGROUND OF THE INVENTION

Field of the Invention

The field of the invention is personnel screening, intruder detection and combat identification.

The problem of screening unauthorized personnel from large organizations or military perimeters is complicated when potential intruders or adversaries obtain access to organizational clothing or uniforms. Even situations in which personnel security badging can be used to identify unauthorized personnel onsite, the use of stolen or fake uniforms can allow intruders to approach close enough to cause great harm to access point and other personnel. The threat is even greater in the field where adversaries posing as friendly forces can approach formations and inflict many casualties. Security controls and safe distances can be compromised when personnel rely on the organizational clothing or uniforms as a first level of screening for personnel who are not close enough for inspection of personnel security badging.

This problem is particularly costly in police and military situations and has been the basis of many casualties caused by intruders or insurgent forces who have gained access to the uniforms of indigenous or allied forces. This has often led to deadly results with the increase in suicide improvised explosive attacks within the last few decades. These type of attacks threaten security forces in all settings, including highly secure locations such as police stations and military compounds as well as during operations in the field. In all parts of the world, intruders who have access to police or military uniforms can cause great harm. For many years, police and military forces have relied on personnel security badging and screening to identify unauthorized personnel who are wearing official uniforms. Governments in many parts of the world have also established controls over the sources of supply for official uniforms in order to reduce the vulnerability of their security forces. More advanced militaries have relied on advanced technology to mitigate these threats. This includes friendly force or combat identification systems during operations in the field and various camera, biometric, and other personnel screening technologies at security checkpoints or at the access points to secure compounds. Many security controls which have reduced this threat in more advanced countries have not been able to be widely used in less developed countries because of cost or complexity. It is also difficult to rely on the control of uniform sources of supply in many developing parts of the world because of a lack of infrastructure or poorly developed civilian or military administration systems in these parts of the world. It is also true that the opportunity to rely on advanced technology or even simple uniform control procedures to reduce these threats is greatly diminished when conflict is ongoing in a country where a government does not exert control over all areas or where an international force is working with local authorities to train local security forces and re-establish security throughout a region.

Inventions in the prior art concerning personnel identification and screening or other technologies have not fully addressed these problems. In particular, the continuing number of security personnel who are being killed routinely throughout the world by adversaries or insurgents wearing friendly uniforms underscores that past inventions have not directly addressed this problem nor aided people with normal skill in the field to find an effective solution. The present invention believes that the most effective solution to this problem is a novel use of a technology that can be integrated and worn with the uniforms, that is itself very low cost and also does not require expensive technology to use. It is important that a solution based on a wearable technology which is tied to the authorized uniform be used to address the problem when uniforms are obtained illegitimately by hostile forces or individuals. Past inventions which are centered on the authorized users but not a part of the uniforms will suffer from unauthorized personnel obtaining official uniforms when they are not worn by the intended security personnel (for example, lost or stolen from the laundry). Low cost is very important for a uniform-based solution because of the number of uniforms in use. In addition to the use of wearable technology attached to the uniform, another important aspect of a solution which is effective at all times will be one which can be used with normal equipment available to security forces both in the garrison as well as in the field during operations. Complex or costly technology used for screening in advanced and developed nations will not work in most parts of the world with existing resources and training of those security forces. An additional aspect of an invention which solves this problem is that the application of the technology must be tamper proof. The invention will not solve the problem caused by adversaries or insurgents if it does not provide protections against tampering by those forces.

Description of Related Art

The following discussion of past personnel identification and screening approaches in the prior art explains how these approaches do not adequately address the problem nor disclose a means of addressing this problem by someone skilled in the art. In each case, the unique aspects of the problem at hand which are not addressed in the prior art and are only addressed with the novel approach disclosed in the current invention are explained.

Access Point Control Technology

A number of past inventions provide inventions for devices or methods to be used when screening personnel at access points. Many of these inventions rely on either advanced sensing systems, advanced terminal technologies (card readers, computer terminals, etc.), or both for improved identification and screening. The advanced sensing systems rely on 2-way signals (receive+transmit) or interrogation and response, such as x-ray, laser, magnetic anomaly, nuclear resonance or other 2-way means. These systems require equipment and technology which is not supported by security forces or their training in many parts of the world. Similarly, the access control inventions which rely on special terminal equipment such as card readers or computer and software are not easily implemented in many parts of the world. Additionally, these inventions do not address the need for intruder detection during field operations. All of the inventions in this category are by their nature designed for an improved access control point where conditions are much different than those in the field. For this reason, none of these inventions will address the identification and detection needs in the field in most cases. The current invention includes a novel combination of features which uniquely address detection of intruders wearing unauthorized or compromised uniforms far beyond what the technology in the prior art alone can. The 1-way identification signal of the current invention which is integrated with the uniform and provides pass code protection, timeout and tamper proof protections against a threat at a distance prevents an intruder from exploiting a compromised identification signal that other access point technology would pass without detection or would allow an intruder the proximity within safe distances to do great harm. The simplicity of the current invention and its intended use with existing tactical equipment further enhances the usefulness of the invention, but the novel combination of features which makes this invention ideally suited to eliminate a threat from an intruder in a uniform sets it apart from the prior art in this category. The current inventor believes that all access control inventions methods and technology to-date fail to incorporate the novel features of the current invention which are uniquely designed to address this threat at an access point where other inventions in the prior art are not. The following are examples from recent prior art which demonstrates this. A note is provided next to each to explain what technology is used in the prior art in place of the novel combination in the current invention.

U.S. Pat. No. 8,111,156, Song (pyro sensors, microphones & accelerometers), U.S. Pat. No. 7,898,385, Kocher (RF, imaging & body position), U.S. Pat. No. 7,605,709, Toliver (biometrics, x-ray, pulse induction, ion mobility spectrometry & document scanning), U.S. Pat. No. 7,365,536, Crowley and Lathrop (magnetic anomaly, nuclear sensors, metal detector), U.S. Pat. No. 6,421,453, Kanevsky et. al. (biometric, gestures & password authentication), U.S. Pat. No. 5,056,141, Dyke (word-pair voice recognition), European patent CN102324010, Huaijiang et. al. (RF & optical frequency), US patent application 2010219241, Corwin et. al. (id card & bar code), European patent EP0138525, Rudland (IR card reader), European patent EP2619558, Rayner (x-ray), European patent application MX2012010644, Katowski et. al. (x-ray), European patent application MX2012010642, Gray et. al. (x-ray), U.S. Pat. Nos. 8,135, 112 and 7,796,733, Hughes (both x-ray), U.S. Pat. Nos. 7,809,109, 7,796,734, 7,593,506 and 7,505,562, Mastronardi et. al. (all x-ray), U.S. Pat. No. 7,889,053, McGrath et. al. (Microwave biometrics)

Each of these examples in the prior art clearly suffer from using identification or screening technology which does not provide safe distance needed to defeat the threat of intruders who are intending to cause harm. All of these methods and inventions are also costly, complex or advanced technologies which are not available to most security forces throughout the world. In addition to these more easily disposed cases in the prior art, U.S. Pat. Nos. 7,849,619, 7,204,425, and 5,973,600, Mosher et. al., disclose a series of inventions proposed for personnel screening and identification which require further discussion. In the Mosher prior art, an identification appliance is described which can be "worn" by individuals. However, the means of wearing described in the Mosher prior art is based on a band which can be worn on the wrist, arm, ankle, neck, etc. and it is not described as a device which is integrated as part of the user's uniform. Mosher also provides for the use of non-visible identification signals, including optical and radio-frequency signals. However, the inventions are designed for personnel screening and all are intended to be read at close distance. Mosher recognizes that a wearable device based on a band can be easily pilfered and suffer tampering. He includes tamper-proofing of the apparatus based on connections and electrical signals in his description and claims. His prior art includes password and Personal Identification Number (PIN) protection and tamper-proofing connections and couplings in the description, but not in the claims. Several of these features are similar to the current invention. However, Mosher's prior art fails to include all of the key features which are needed to defeat the threat posed by intruders in stolen or fake uniforms. Most notably, Mosher fails to disclose the novel combination of a password-protected, tamper-proof identification signal with a device which is integrated as part of a user's uniform and which supports identification at safe ranges. Without combining the non-visible identification signal which has PIN-protection and tamper-proofing with a means to integrate the identification function with the uniform and also support identification at safe distances, Mosher fails to effectively address the real-world problems presented by intruders. The current invention's novel combination of all of these features addresses this threat where Mosher fails.

Biometric Screening Technology

Biometric screening can be an effective means of identification at close range. However, these methods do not meet the need to identify intruders at safe distances in access control points nor do they provide effective means to provide friendly force identification at tactical ranges in the field. The novel aspects of the current invention which allow friendly force identification and intruder detection at stand off or tactical distances makes it superior to all biometric screening technologies and methods. For these reasons, the inventor believes that all biometric screening or identification methods involving contact with the potential intruder or are only effective within an unsafe, short range suffer a fatal deficiency which are addressed by the novel aspects of the current invention. The following are examples from recent prior art within this category which demonstrates this.

U.S. Pat. No. 7,494,061, Reinhold, U.S. Pat. No. 6,871,287, Ellingson, U.S. Pat. No. 6,655,585, Shinn, U.S. Pat. No. 6,119,096, Mann et. al., U.S. Pat. No. 6,018,739, Mccoy, U.S. Pat. No. 5,229,764, Matchett et. al., and European patent application DE202005007113, Treptow Optical Sensors and Readers This category of the prior art covers all identification and screening technologies which use optical reading devices or codes. Traditional optical codes and identification technology is not suited to addressing the unique problems for friendly force identification and intruder detection because they use codes or optical signals which are visible to humans. These inventions require that a code or an optical signal be read by a person or a card reader device at close ranges. These aspects defeat the viability of the prior art in this category for two reasons. First, the codes or optical signals in the visible spectrum are more easily exploited in a tactical setting or spoofed by an intruder than optical devices operating in the non-visible range. Second, the inventions in this category usually require the unsafe distances to be effective as explained in the Biometric category above. An additional impediment to some of the prior art in this category is the need for some of these systems to combine optical identification methods with other close range methods, such as biometric screening or computer passwords. This is often required because the prior art systems can be lost or stolen and they do not include the pass code protection and timeout features of the current invention to prevent them from being exploited. For example, U.S. Pat. No. 4,837,568 by Snaper discloses a personnel identification device which can be lost or stolen and must be used with other identification means based on biometrics or computer passwords to protect against exploitation. The novel use of an optical signal in the non-visible range which is effective at safe distances or tactical ranges separates the current invention from this category of past inventions that do not solve the problem. Further, those systems described in the prior art which rely on other close-range identification methods to protect against device exploitation do not use the novel features of the current invention which defeat exploitation without using any of these other close-range methods. The inventor believes that all prior art which relies on a visible optical code or signal and those which are only effective at close distance to the prospective intruder differ substantially from the novel aspects of the current invention. The following are examples from recent prior art within this category which demonstrates this.

U.S. Pat. No. 4,837,568, Snaper, European patent application DE202005007113, Treptow Interrogating Identification and Interrogation Friend or Foe (IFF) Systems Many IFF systems are described in the prior art. A key aspect of IFF is the interrogation, making the method for identification a 2-way communication. The current invention uses an active identification signal in most embodiments to provide a 1-way identification method. Furthermore, in all embodiments, the identification function is integrated with the user's uniform. All IFF systems in the prior art rely on components which are not integrated within the user's uniform, either in whole or in part. Even if the IFF equipment used for identification can be carried by an individual soldier, it is not integrated with the uniform so that it will aid in intruder detection if the uniform is lost or stolen by adversaries or insurgents. For these reasons, any prior art which relies on traditional IFF systems and technology is not prejudicial to the novelty or uniqueness of the current invention which uses a wearable identification signal that is integrated into the user's uniform and provides pass code protection, timeout and tamper-proof features to aid in intruder detection if the uniform is lost or stolen. The following prior art are examples of IFF systems which fall into this category:

U.S. Pat. Nos. 7,831,150 and 7,308,202, Roes et. al., U.S. Pat. Nos. 7,224,308 and 6,816,106, Butler, U.S. Pat. No. 5,648,862, Owen, U.S. Pat. No. 4,955,000, Nastrom, European patent WO02084324, Tatum et. al., U. S. patent application 20120189312, Maryfield et. al.

RF Identification

Many RF Identification methods are found in the prior art. Most of these are for object identification and do not describe personnel identification methods. For those that do describe personnel methods, many of these are for personnel identification or screening at close range. Passive RFID systems fall into one or both of these groups due to the distance limitations of this technology. The only RFID systems which support a stand off range similar to the current invention are active RFID systems. One embodiment of the current invention includes an active RF identification signal. However, the use of the RF identification signal in the current invention is in Passive Reader Active Tag (PRAT) or beacon mode. It uses a 1-way identification signal method like the other embodiments of the invention and it does not rely on an active reader interrogation to initiate 2-way communications. For these reasons, only the prior art which involves the PRAT systems can be similar to the current invention. However, if the PRAT systems in the prior art do not include tags which are integrated with a user's clothing, then it is unlikely to be an impediment of the current invention. Most RFID tags which are integrated structurally with the object of interest (person, animal or object) are not intended for beacon mode operation or PRAT systems. Those that are designed for continuous broadcast of the identification signal. This is substantially different than the current invention which uses its novel features of pass code protection and time-limited operation to disable the identification function in the RF identification embodiment of the invention just like the preferred embodiments using optical signals. Unless the RFID system incorporates the same novel combination of features found in the current invention which contribute directly to friendly-force identification and intruder detection even when user clothing has been compromised, such prior art does not prejudice the novelty and uniqueness of the current invention. The following prior art are specific examples of RFID systems which have some similar features with the current invention (human wearable, but not attached, and Kotik includes tamper-proof features). However, neither of these examples include the novel combination of all of the key features of the current invention which prevent exploitation of a user's uniform (including pass code protection, timeout and 1-way signaling only in these cases):

U.S. Pat. No. 7,316,358, Kotik et. al., U.S. Pat. No. 5,973,598, Beigel

Intruder Detection Systems

Most intrusion detection systems in the prior art are based on fixed or specialized camera, imaging or other equipment used for monitoring of facilities or homes. Many involve motion detection and alarm and not authorized personnel identification. Those that involve cameras, imaging, face recognition, and similar technologies can have some application to personnel identification and screening. However, these systems differ markedly from the current invention because they do not include man-portable or even wearable components and they are not designed to operate in the field or at remote temporary security locations such as a checkpoint. The use of some of these technologies at an established access control point is similar to how the current invention supports friendly-force identification and intruder detection at a base or compound access point. However, since the prior art in this category does not include the wearable, 1-way identification devices which are part of the key features of the current invention, none are thought to address the intruder detection problem described in this invention nor present a problem to the novelty of the current invention. The following are examples from the prior art which illustrate this.

U.S. Pat. No. 8,542,109, Butler et. al., U.S. Pat. No. 8,354,928, Morcom, U.S. Pat. No. 8,258,949, Jaynes, U.S. Pat. No. 6,593,852, Gutta et. al.

Non-Identification Badging

Prior art which involves badging technology fall into two broad subcategories. Those inventions within the prior art that deal with the construction, placement or wearing of a badge but do not describe any unique identification function are not relevant to the problem described above or an obstacle to the current invention. The badging technology in the prior art which also includes identification functions are the second subcategory. Badging in this latter subcategory can include those which are only useful at close range and those which are used for identification at farther ranges. The badging requiring close range use for successful identification differs from the current invention because the current invention relies on features which make it effective at stand off ranges. But the badging which is intended for farther ranges is also not prejudicial to the current invention because these badging systems with longer range use do not include the combination of non-visible identification signals, pass code security and timeout features with a device which is integrated with the user's uniform which make the current invention uniquely suited to defeat the stolen or fake uniform threat. The following are examples of both of the subcategories within the prior art for badging technology which do not have the novel features of the current invention for the problem described above.

European patent GB 1044443 (A) Atomic Energy Commission, U. S. patent application 20060087410, Garcia et. al.

Non-Individual Combat Identification

Many efforts have been made to reduce the confusion on the battlefield by creating a means to identify and distinguish friendly forces from adversaries. In recent years these technologies have become known as combat identification. The original combat identification systems were designed for vehicles or formations. The prior art in this category do not provide a means of individual identification for personnel who are not mounted in the supported vehicles. Any prior art involving combat identification which does not support individual, dismounted personnel does not relate to the current invention. The following prior art is in this category and has no bearing on the current invention.

U.S. Pat. No. 8,462,042, Delong & Blythe, U.S. Pat. No. 6,097,330, Kiser, U.S. Pat. No. 5,686,722, Dobois et al., U.S. Pat. No. 5,274,379, R. Carbonneau et al., U.S. Pat. No. 5,459,470, Wooton et al., U.S. Pat. No. 5,819,164, Sun et al., U.S. Pat. No. 4,851,849, Albersdoerfer, U.S. Pat. No. 4,694,297, Sewards Individual Soldier Combat Identification Prior art involving combat identification for the individual soldier is related to the current invention. Most of the prior art involves attempts to move the traditional combat identification systems from vehicles and integrate them with the foot soldier. For this reason, most in this category are similar to the IFF systems and involve some form of RF or IR interrogation. Some also involve the reduction of communications equipment to be portable. However, for the reasons that the 2-way IFF systems are not similar to the novel features of the current invention, the prior art in this category is not similar to the current invention. Combat identification systems which are not integrated with the soldier's clothing and which are still mounted on equipment, even if handheld, do not incorporate the novel integration of the identification signal with the uniform as in the current invention. Also, the interrogating 2-way methods used in the prior art is not similar to the current invention because all but one embodiment of the current invention relies on 1-way identification signals to more effectively defeat the intruder threat. As in the case of the prior art for IFF systems, unless a combat identification system from the prior art includes the novel features of the current invention including a wearable identification signal that is integrated into the user's uniform, use of 1-way signaling in most embodiments and pass code, timeout and tamper-proof security features in all embodiments to prevent compromise, the prior art cannot apply to the current invention. The following prior art in this category are combat identification systems which may have some similar features, but do not have the combination of features which makes the current invention novel for addressing the intruder detection problem.

U.S. Pat. No. 8,184,981 Ivtsenkov et. al., U.S. Pat. Nos. 8,115,697 and 7,196,655, Hayles & Omara, U.S. Pat. No. 5,966,226, Gerber, European patent WO0133748, Radomsky, U. S. patent 20090045996, Ivtsenko Each of these examples in the prior art clearly suffer from one or both of the problems explained above for most of the prior art in this category. In addition to these more easily disposed cases in the prior art, there are a few combat identification systems which are worth further discussion to make it more clear how these significantly differ from the novel features of the current invention. Each of the following combat identification systems from the prior art include one or two features which are similar to the current invention. However, the following discussion will show that each one of these inventions is still lacking in its ability to effectively address the threat of intruder exploitation of stolen or fake uniforms because none of them contain all of the key features which are required to defeat this threat. How the current invention does this compared to each of these systems is explained in the following.

U.S. Pat. No. 7,983,565, Varshneya, discloses laser ranging and 2-way optical communications based on lasers for combat identification and other operation. The 2-way optical communications method used in Varshneya is not similar to the 1-way identification method used in most embodiments of the current invention nor is it comparable in its effects to the non-visible signaling method defined in the preferred embodiment of the current invention. Varshneya describes a retro-reflective method for use with his laser device which is similar to one embodiment of the current invention that uses retro-reflective or other reflective surfaces for 2-way optical identification signals. Varshneya includes this method in the description of the invention but not in the claims. He also includes a general reference to password protection of some of the equipment used in his system in the description of the invention but not in its claims. The reflective methods and the password protection are the only similarities to the current invention. However, Varshneya's invention does not cover the novel combination of all features used by the current invention for identification and intruder detection. Specifically, Varshneya's system is based on equipment which is mounted or integrated with combat equipment. It is not a wearable system which is integrated into the user's clothing like the current invention. Varshneya does not contemplate nor disclose a time limit for the password protection which he discusses briefly. By not integrating his system components in the uniform and by not describing specific steps for tamper proofing like in the current invention, Varshneya's inventions suffers from the common problem of pilfering, tampering and exploitation which all portable equipment-based systems suffer. Additionally, Varshneya's intended use for the invention is substantially different than the current invention. In Varshneya, the invention uses a 2-way exchange of a code of the day word using his laser-based communications. This is much more of a complex identification function than the current invention which relies on observation of a 1-way non-visible or visible identification signal. The complexity in Varshneya's intended use compared to the applications of the current invention shows that the current invention is much more likely to be useful to a less technologically-advanced security force where cost, availability of equipment and training are factors. For these reasons, it is believed that prior art in Varshneya does not disclose the same type of novel combination of key features of the current invention including the integration of an identification signal with a user's clothing, pass code protection, time-limits, and tamper-proof identification signals which is uniquely suited for dealing with the threat of stolen or fake uniforms in tactical and security scenarios. Further, the 2-way complex communication described in Varshneya is substantially different than the 1-way methods for identification used in all but one embodiment of the current invention. Yet even in the single embodiment of the current invention which uses 2-way identification based on reflective surfaces, the current invention uses a novel combination of features for an identification and intruder detection system which Varshneya's use of reflective surfaces does not contemplate. The novel use of a pass code protected, time-limited, tamper-proof identification signal even for the embodiment of the current invention which uses reflective surfaces is not found in Varshneya's prior art nor an obvious extension of his system.

U.S. Pat. No. 6,701,649, Brosi, also involves combat identification based on reflective IR signaling. Brosi claims attachment of his invention to head gear or a uniform, which is similar to the use of an identification signal which is integrated with the user's uniform in the current invention. Like Varshneya, the reflective surface of Brosi is only similar to the single embodiment of the current invention which relies on reflective surfaces. As with Varshneya's reflective surface, the use of a reflective surface alone with identification systems does not make it similar to the current invention. Brosi does not include the novel combination of features of the current invention in his prior art. Even though it is based on a signal which attaches to the uniform, the identification signal is not pass code protected, is not time-limited and not tamper-proof like the current invention. All other embodiments of the current invention also do not rely on a reflective surface for identification as in Brosi. For these reasons, Brosi's prior art does not cover the novel combination of features and invention of the current invention which are uniquely suited to identification and intruder detection.

U.S. Pat. No. 5,414,405, Hoggs is similar to Brosi in that it provides a means of attaching a personnel identification device to a user's uniform. Hoggs uses non-visible light for his identification system in place of the reflective surface in Brosi. The non-visible identification signal in Hoggs is similar to the use of non-visible identification signals in most of the embodiments of the current invention. However like Brosi, Hoggs does not cover the novel combination of features which the current invention uses for identification and intruder detection. The current invention provides a non-visible identification signal which is wearable and integrated with the user's uniform, but this system is also password-protected, time-limited and tamper-proofed. This novel combination of features in the current invention are not covered by Hoggs and are not obvious extensions of his prior art.

U.S. Pat. No. 5,299,227, Rose, discloses a 1-way signaling system based on non-visible signals for identification of individual combatants. This is similar to the 1-way, non-visible signaling used by the current invention. Like Varshneya however, Rose relies on attaching the identification signal to equipment or outer vests rather than integrating the system as part of the clothing. This presents the same problems as other similar inventions: it is removable and can be pilfered, suffer tampering, or replaced and exploited. There is no password protection or timeout of the identification signal in Rose's prior art. It is also the case that the invention of Rose is designed not to work with existing non-visible viewing systems such as night vision. This means that Rose is lacking the critical need to be able to be used without costly or special extra reading equipment. For these reasons, the prior art in Rose does not compare to the novel combination of features in the current invention including the integration of an identification signal with a user's uniform, pass code protection, time-limited operation, and tamper-proofing and alerts and it is not effective for use by security forces which do not have specialized or costly viewing equipment.

Identification Beacons

Prior art exists for beaconing devices which are carried by individuals and are used to aid in search and rescue operations. Many of these devices are designed to make an individual or groups location known to the searchers. In these cases, identification of the individual or the party is not the central purpose of the device. In particular, if the device can be shared by members of a group in order to help search parties find the group, these devices are not particularly related to individual identification. On the other hand, there are some beaconing technologies which aid in the identification of the individual in addition to helping the search team find that person. This latter type of device could more rightly be referred to as identification beacons and may have some features similar to the present invention, even though the principal purpose of these latter devices is still related to use in finding a lost person. However, no prior art in this category has been found to possess all of the key features of the current invention which make it novel. In particular, very few of the devices in this category are integrated with the clothing or uniform. Many are devices which can be attached to clothing or carried on the body of the individual, but very few of them can be considered integrated with the clothing like the current invention. Similarly, many of these devices rely on visible signals or use signals which are not intended to be used covertly or have low probability of intercept by and adversary. Of those which are integrated with the clothing and do use a non-visible or non-obvious signal, these do not possess all of the other key features of the current invention, including the use of a signal which cannot be intercepted by an adversary or the use of password or pass code protected, time limited, secure features with various forms of tamper-proofing which prevent an unauthorized person from compromising and exploiting the identification device. The following are examples from this category of prior art which may be considered.

U.S. Pat. No. 5,929,777, Reynolds, U.S. Pat. No. 7,336,189, Thomas, U. S. patent application 20150265860, Kennedy et al, U. S. patent application 20130109427, Matus.

U.S. Pat. No. 5,929,777, Reynolds, is a personal infrared beacon which is attached to an individual's clothing or carried in a hand-held device. The intention of Reynolds is to design a device which is mobile, easy to use and low cost. These goals are also achieved in the current invention and the arguments which Reynolds uses to overcome its prior art would similarly distinguish the current invention from that art. Like the current invention, Reynolds also discloses the use of a non-visible signal based on infrared light which is both not easily seen by hostile forces and can be detected by friendly forces using already existing tactical equipment. However, there are several key differences which distinguish the current invention as novel compared to Reynolds. Reynolds does not disclose a wearable identification device which is integrated with the clothing or uniform of the user. This is not only a clear design distinction of the current invention, but by relying on being attached to the clothing or carried separately, this is one flaw of several which prevent Reynolds from disclosing the type of security features and tamper-proofing which are key to the current invention. Because it is not integrated with the user's clothing, an adversary can easily compromise the identification device and exploit it against friendly forces. Furthermore, Reynolds does not intend to disclose and does not claim the other security and tamper-proofing features of the current invention which make the current invention much more novel for use in a hostile environment where compromise and exploitation is likely.

Other differences between the current invention and the device disclosed in Reynolds are substantial and further distinguish the novelty of the current invention. The use of the device in Reynolds does not require authentication and the device does not include pass code protected, time limited security features against exploitation and use by an enemy agent. Further, Reynolds does not disclose any tamper-proofing similar to the current invention which would prevent an adversary from using the Reynolds device to impersonate friendly forces and lure a search and rescue team into an ambush. Reynolds discloses a keypad input with his device, but the keypad is used for disabling the distress signal. One is not required by Reynolds to authenticate that the user is authorized to use the device or to input a code every so often to allow continued use of the device. There are also no tamper-proofing features as in the current invention which will disable the device operation to prevent an unauthorized user from using the device. Unlike the current invention which uses novel features to identify unauthorized personnel from friendly forces at a security checkpoint or in the field, the Reynolds patent focuses on emergency response conditions and positively identifying a known personnel who is lost or in distress. This prior art does not provide identification in a non-emergency situation as with the current invention and because it lacks several of the key security and tamper-proofing features of the current invention, Reynolds cannot identify an unauthorized person who has compromised the device and is using it to gain advantage over friendly forces. For all of these reasons, the prior art in Reynolds does not compare to the novel combination of features in the current invention including the integration of an identification signal with a user's uniform, pass code protection, time-limited operation, and tamper-proofing and it is not effective for use by security forces at security access points or in the field to identify both authorized and unauthorized users.

U.S. Pat. No. 7,336,189, Thomas, claims a method for locating persons based on a body borne beacon which is detected at long range against a differentiated background. Thomas is intended to locate a person by detecting signals at great distances among a background where the beacon signal stands out. Without any detail, Thomas discloses the attachment of the beacon to the persons clothing through painting or spraying it on. This is not as permanently integrated with the clothing as the device of the current invention, but if it was possible, it would be an integration approach with the person's apparel which is on a similar scale as the integrated device of the current invention. Although this may be considered similar, there are many differences between what is disclosed in Thomas' method and the current invention. The beacon disclosed in Thomas does not include security features which prevent its use by an unauthorized user or which help distinguish and adversary from a friendly person. Thomas does disclose the use of a non-visible signal, but it is intended primarily to avoid detection by the person being located, as in the use case described in the prior art for a prisoner who would not know that he was being located. This is a completely different intention and design from the current invention which uses non-visible signal to allow an authorized user who is cognizant of the device signal capabilities to identify himself with friendly forces while preventing an unauthorized user to be aware of the signal to friendly forces. Further, the beacon in Thomas has no pass code protection, timeout limited operations or any other tamper-proofing to prevent an unintended user from exploiting it against friendly forces as does the current invention. For example, if the prisoner described in Thomas who is wearing the beacon becomes aware that the beacon is borne on his clothing, he could change his clothing or he could have a decoy wear his clothing for him. The security and tamper-proofing features of the current invention uniquely prevent exploitation unlike Thomas. The present invention is also designed to be effective at ranges related to security checkpoints or between units in the field and the beacon disclosed in Thomas would not be expected to work well at these ranges due to the need for Thomas' beacon to be seen against a large background for it to be effective. For these reasons, Thomas does not compare to the novel combination of features in the current invention including the permanent integration of an identification signal with a user's uniform, pass code protection, time-limited operation, and tamper-proofing, it is not designed to protect against exploitation by unauthorized or unintended users and it is not effective for use by security forces at ranges required at security access points or in the field to identify both authorized and unauthorized users.

U. S. patent application 20150265860, Kennedy, discloses a safety system which includes an audible and visible alarm signal when a load under weight meets certain conditions during loading. This prior art involves an alert signal, but it is far from the individual beacons discussed above and still farther from the individual identification device of the current invention. Kennedy detects a problem and alerts one or more users, but it is not integrated with clothing, it is based on visible or obvious signaling, and it has no security features to prevent unauthorized use or tampering. For these reasons, Kennedy does not compare to the novel combination of features in the current invention including the permanent integration of an identification signal with a user's uniform, pass code protection, time-limited operation, and tamper-proofing, it is not designed to protect against exploitation by unauthorized users and it is not designed for use by security forces to identify both authorized and unauthorized users.

U. S. patent application 20130109427, Matus discloses methods based on a personal beacon which communicate with a mobile device or other computer. Matus includes the integration of the personal beacon in the users clothing like the current invention. However, Matus does not disclose a device which is suited for use by security forces at security access points or in the field for identifying authorized and unauthorized users like the current invention does. Indeed, the intent of Matus to design a method for continually monitoring of personal security beacons until one reaches a condition representing duress (for example, out of range, user inputs) is markedly different than the intent of the current invention which does not continuously monitor the identification devices but only uses the identification devices to identify a user when the user is approaching a security check point. Additionally, the methods Matus discloses include the use of non-visible electromagnetic communication, but the signal is not designed to avoid detection and exploitation by an adversary. Although the mobile computing devices disclosed by Matus are expected to have common authentication and timeout security features, no discussion of security features for the beacon itself is disclosed. Matus' personal beacon which is attached to or integrated with the user's clothing can be compromised and exploited with the clothing. There is no pass code protection, timeout limited operations or tamper-proofing features. For these reasons, Matus does not compare to the novel combination of features in the current invention including the non-continuous use of the device for identification, pass code protection, time-limited operation, and tamper-proofing, it is not designed to protect against exploitation by unauthorized users and it is not designed for use by security forces to identify both authorized and unauthorized users.

Several of the references in the category of identification beacons appear to detect a problem, then send a signal or activate a beacon to alert people. This concept of operation in the prior art is markedly different from the intent and design of the current invention. The current invention is not intended to detect a lost user or someone "under duress." Actually, a user could be behaving not out of the ordinary, without any sign of duress and still be identified as a threat using the current invention. Further, the current invention does not require "duress" or another emergency activity to perform the identification function. These key differences between the prior art in the identification beacon category, as discussed above, should clearly distinguish the novel and unique elements of the current invention from the prior art of this kind.

As can be seen by the preceding exhaustive review of the prior art and the background of the current invention, no identification system in the prior art or found elsewhere is known today which provides a novel combination of all of the following key features that are needed to effectively address the need for identification and detection of intruders who are wearing stolen or fake uniforms. It is the intention of the current invention to provide a novel combination of all of these features and provide an effective solution which meets this need.

wearable
   identity integrated with official uniform
   pass code protected operation
   automatic timeout after pass code expires
   tamper proof and not pilferable/removable
   provides alert signal if tampering or failure is detected
   uses non-visible signaling
   works at stand off and tactical ranges
   optionally extremely low cost
   optionally works with current equipment and training
   optionally change mode between non-visible signaling methods and frequencies

BRIEF SUMMARY OF THE INVENTION

A wearable, non-visible identification device that provides reliable, tamper proof, friendly-force identification and intruder detection. The device includes a user input device or surface for daily entry of a unit- or user-defined pass code. This can be a keypad, touchpad, or other user input device. A timeout capability allows the device to disable the identification signal if the pass code is not entered within the specified time period. For example, the device can be designed to require pass code entry every day and disable the identification function if the pass code is not re-entered within 24 hours. The device is integrated with the user's uniform and provides a non-visible optical identification signal from one or more locations on the uniform. This invention can support one or more locations on a garment or uniform and the intention of this invention is to cover any location and configuration of identification signals on a user's uniform within the scope of the invention and be protected by the accompanying claims. The device can be programmed to support user configuration of various operating parameters including intensity, blinking mode, pattern, duty cycle, non-visible frequency, reflective mode, power mode, security mode, pass code, timeout function, and other operating parameters or these parameters can be programmed as fixed values.

When integrated with the uniform, the device provides a pass code protected, time limited identification function with other protections against tampering. These features of the invention prevent the use of the uniform by unauthorized personnel. If a uniform with the device is lost in the laundry or while it is being transported separately from the user, an unauthorized user or intruder who is wearing the uniform after the timeout has disabled the identification function will not be able to identify themselves as a member of the unit or organization represented by that uniform. If the unit or organization using that uniform incorporates proper identification procedures into its security operations, an intruder will not be able to approach the other unit or organization members without prompt detection. This invention provides the capability for friendly-force identification or intruder detection at a safe distance or tactical range which is only limited by the effective range of the identification signal. For the non-visible optical identification, an intruder can be detected within line-of-sight distance, well before the distance required to read a security badge or perform other normal forms of personnel screening. This safe distance will dramatically reduce the ability of covert intruders in misappropriated uniforms from causing casualties at close range.

In addition to the pass code protection, other security features of the invention will prevent the use of the device by unauthorized personnel when tampering is detected. The tamper-proof features of the invention include electrically-sensitive threads which are integrated within the device's stitching with the uniform, in such a way so that the device will not perform its identification function if it is removed from the garment or these threads are cut. Also, tampering can be detected if unexpected changes to the power source or its connections occur. If connections to the identification signal components of the device are broken, the processor component will disable the identification function until the user pass code is authenticated. This protection can be designed to disable only a single identification signal or to disable all identification signals if tampering is detected. If the device loses power or the connection to the power source is broken, the processor component will disable the identification function until power is restored and the user pass code is authenticated. The device can be designed to provide a default non-visible or visible alert signal at the factory to identify tampering during initial shipping or following the loss of power, loss of a connection to an identification signal, or when other failures or tampering is detected in the field. The processor component can also be designed to disable the identification function or display an alert signal when processor changes or errors are encountered, such as software exceptions, malicious software, firmware changes or other similar indications of tampering or unauthorized processor changes. A variety of these tamper-proof security features or combinations of them can be included in the design of the current invention. The intent of this invention is to cover the tamper-proof features described here including a) electrically-sensitive threads or other types of garment construction which supports the detection of tampering with the identification signal component or its location; b) processor or other device functions which disable the device following loss of connection with the identification signals or with the power source; c) processor functions which detect changes to the processor on power-up or during operation indicating tampering or unauthorized software or firmware changes; and d) use of a visible default alert signal when the device is first shipped and has not been configured or initialized by the user or when tampering or faults are detected. The invention is intended to cover any other tamper-proof features of the invention which are similar to features a) to d) listed above, but include obvious or apparent changes, improvements or differences to someone skilled in the art and that all such tamper-proof features or changes or improvements to these tamper-proof features are intended to be within the scope of this invention and protected by the accompanying claims.

An alternative embodiment for this invention uses a removable and attachable identification signal component or entire device which can be removed by the user from one uniform and attached to another uniform or another location on the same uniform. This embodiment supports the re-use of devices or the use of different uniforms for different missions or geographic location. In this embodiment, the tamper-proof protections are modified to allow removal and re-attachment by an authorized user but maintains tamper-proofing features which prevent unauthorized tampering. For example, the permanent device embodiment tamper-proofing may include disabling of the device permanently when the device is removed. For the removable embodiment, the device can include a temporary disabling of the device upon removal but allow the device to be enabled again when the pass code is entered on the new uniform by an authorized user. A variety of means for removing and re-attaching the device or its indication component can be designed as part of this embodiment and a variety of tamper-proof modifications can be made for this embodiment. The intention of this invention is to cover any and all means for removing and attaching of the device or its indication component and any and all means of tamper-proof modifications or configurations are covered within the scope of the invention and are protected by the accompanying claims.

Another embodiment of the invention uses visible light identification signals for friendly-force identification or intruder detection. The device can be designed using visible light identification only or in conjunction with the other forms of identification signaling from the other embodiments. A variety of designs for the visible light indication can be part of this embodiment including different numbers, frequencies, brightness, blinking behavior, pattern, modulation control, or other characteristics. The intention of this invention is that any and all visible light identification are covered within the scope of the invention and are protected by the accompanying claims.

An alternative embodiment of the invention uses an alert signal after the processor timeout occurs or tampering is detected. This embodiment uses an alert signal displayed on one or more identification signal components in place of disabling the identification function. When considering this embodiment, all references in the description of the invention which refer to the disabling of the identification function should be interpreted to mean the use of the alert signal in place of disabling the identification function. The device can be designed to use non-visible or visible signals for the alert signal. When non-visible signals are used for both identification signals during normal operation and the alert signal, the alert signal will have markedly different characteristics including frequency, intensity, pattern, modulation or other characteristics so that it will be obvious that an alert for an unauthorized use of the device is being displayed. The same requirement will apply with visible identification signals are used with visible alert signals. A variety of means for displaying an alert signal following timeout or tampering can be used with this invention. The intention of this invention is that any and all such alert signal methods are covered within the scope of the invention and are protected by the accompanying claims.

One embodiment of this invention uses ultraviolet (UV) light as the non-visible identification source. The UV identification can be designed as the only non-visible identification or in conjunction with other non-visible or visible identification signals. This embodiment includes means of controlling or limiting the transmission of the UV identification in order to protect observers from harm. A variety of means can be used to control or limit the UV light signal including controlling the duration, intensity, frequency, blinking mode, pattern, modulation, or other characteristics. The device can be designed to allow the use of the UV identification mode when manually switched on and switched off normally in order to limit the possibility of the use of this identification mode when conditions are not right, when it is desired to use this mode, or only when the observers have UV-capable reading devices or cameras. The intention of this invention is that any and all UV light identification are covered within the scope of the invention and are protected by the accompanying claims.

An alternative embodiment for the invention includes the use of a Radio Frequency Identification (RFID) in place of the non-visible optical signals or in combination with them. The RFID mode can be programmed to be user configurable or fixed at the factory. In RFID mode, the device will transmit an identification signal periodically as an Active RFID tag. This embodiment of the invention can support a variety of RFID protocols and modulation modes and the intention of this invention is that any and all RFID configurations and behaviors are covered within the scope of the invention and are protected by the accompanying claims.

One embodiment of the invention is for the device to include a programmable microprocessor to perform the functions of processing user input through the user interface, configuring the operating parameters and modes at the factory and in the field, changing and processing pass codes, providing device timer functions and performing timeouts, detecting tampering and performing alerts, performing device administration and power management functions, interfacing with external devices, and other microprocessor or device functions.

An alternative embodiment is for the device to include Programmable Logic Device (PLD), Field Programmable Gated Array (FPGA) or non-programmable Application Specific Integrated Circuit (ASIC) processor to perform the functions of processing user input through the user interface, configuring the operating parameters and modes at the factory and in the field, changing and processing pass codes, detecting tampering and performing alerts, providing device timer functions and performing timeouts, performing device administration and power management functions, interfacing with external devices, and other device functions.

Another embodiment for extremely small or extremely low power applications uses thermoelectric or piezoelectric Micro-Electromechanical Systems for low power generation or conversion, such as energy harvesting from body heat and motion.

An alternative embodiment of the invention supports an extremely low-powered implementation with a small battery or for operation using non-battery sources of power including body- or motion-generated power, intermittent solar power, and/or ambient and directed RF power. The device can be designed to work with these non-battery sources only or in conjunction with a small battery and these other sources. This low power embodiment will also support the use of conformal user inputs around the periphery of the device in place of a keypad. A variety of battery sizes and non-battery power sources can be used with this and other embodiments of the invention. It is the intention of the invention that all battery sizes and non-battery power sources which are obvious or apparent to a person of normal skill in the art are covered within the scope of the invention and are protected by the accompanying claims.

Another embodiment includes the use of a reflective or retroreflective surface to provide the non-visible or visible light identification signal. This embodiment implements a 2-way identification method for friendly-force identification or intruder detection. It can support the use of normally available light sources in the field to illuminate the prospective intruder, using the reflection of the reflector as the identification signal. This embodiment includes the pass code protected timeout of the identification signal by incorporating an electronically switched surface of different transparencies over the reflective element which turns completely opaque when the device is disabled by the timeout. The device can be designed to work with this reflective, low power identification signal only or in conjunction with an active light source for the identification signal. This embodiment of the invention can support a variety of reflective or retroreflective surface types and materials and a variety of switchable surfaces for implementing the identification timeout. The intention of this invention is that any and all reflective or retroreflective types and materials and any and all switchable surfaces are covered within the scope of the invention and are protected by the accompanying claims. This embodiment supports the low power embodiment by providing an identification signal which requires no power or extremely small amounts.

An alternative embodiment of the invention includes a digital or other interface to an external wearable combat system or power source. For example, the U. S. Army Future Combat System and Land Warrior programs have developed a computer subsystem for the individual soldier's combat system. The U. S. Air Force is evaluating modular tactical systems for forward air controllers. This embodiment will support digital interfaces to such man-portable, microprocessors, computer or other subsystems of advanced individual combat equipment. It will also support an optional connection to an external power source which will be used to power the device in place of the battery or non-battery sources described in the other embodiments. Under this embodiment, the invention will be able to receive control and configuration signals from the user's other systems. Any external keypad or keyboard system will be able to send pass codes to the invention through the digital or other external interface included in this embodiment. This embodiment of the invention can support a variety of external interfaces to other man-portable computers or other subsystems which are part of an individual combat system and the intention of this invention is that any and all digital or other external interfaces are covered within the scope of the invention and are protected by the accompanying claims.

All embodiments of the current invention rely on identification signals made of non-visible or visible signals. Each of these embodiments can be designed with a variety of signaling methods including different durations, frequencies, patterns, intensities, modulation, blinking or other characteristics or behaviors or combinations of any of these. The intention of this invention is that any and all signaling methods using the non-visible and visible identification signals included in the embodiments of the invention are covered within the scope of the invention and are protected by the accompanying claims.

All embodiments of the current invention include a user pass code input to disable the device after timeout. The references to a pass code in all of these embodiments is intended to cover any type of code, sequence, phrase or other input entered by the user for time-limited activation of the identification function. The intention of this invention is that any and all user inputs that can be used in the embodiments of the invention for this purpose are covered within the scope of the invention and are protected by the accompanying claims.

All embodiments include a variety of numbers and configurations of identification signals located on various garments or equipment worn by users, such as shirts, blouses, hats, headgear, jackets, parkas, utility uniforms and coveralls, vests, outer vests, packs, individual weapon systems, individual communication gear and electronics, pants or other garments which will allow detection of the signal for friendly-force identification and intruder detection. The most common location for non-visible light identification signals will allow the identification signal to be seen by the light sensing equipment at a safe distance. The identification signal under the embodiment which uses RFID identification signals can be located in similar locations or can be located in other locations which are not exposed. Locations for the embodiment of the invention using RFID identification signals must be chosen to prevent clothing or individual equipment from obstructing the RF signal, but more flexibility is possible for location of the identification signal under this embodiment. For all embodiments, the type of garment has to be large enough to contain the minimum components of the invention including at least one identification signal and the processor as described above or to support connections between these components placed on other user garments. All such placement of the identification signal, including the number, location, configuration, types of garment, and other placement characteristics for the device and its components is intended to be covered within the scope of this invention and to be protected by its claims.

Other systems, methods, configurations, features, uses and advantages of the invention will be apparent to one with skill in the art after examination of the information disclosed in this invention and the figures, detailed description and claims. The intention of this invention is that all such additional systems, methods, configurations, features, uses and advantages are within the scope and description of the current invention and are protected by its accompanying claims.

BRIEF DESCRIPTION OF THE SEVERAL VIEWS OF THE DRAWING

The description of the current invention relies on the following drawings. These drawings are not to scale and contain only enough detail for descriptive purposes and are intended to aid in understanding of the invention and the concepts and methods for its use with the accompanying specification and claims.

DETAILED DESCRIPTION OF THE INVENTION

Figure 1:
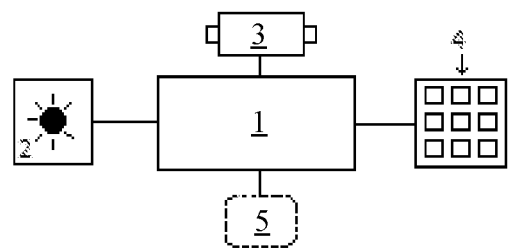
FIG. 1 is a system block diagram showing the components used in different embodiments of the invention.

As used in this specification, the term "processor" refers to a logic circuit or logic processing device such as a microprocessor, PLD, FPGA, or control circuit which is used in any of the embodiments to process user input, control the identification signal, manage the device power or configuration and interface with external interfaces. The "identification signal" refers to the non-visible or visible identification signal which is used in any of the embodiments, including IR, visible, UV lights, RFID tag and beacon, reflective or retro-reflective surfaces, or any other identification signaling method or device used in the embodiments. The term "pass code" refers to any user input code, sequence, word or other input which is used to authenticate the user as an authorized user. The term "power source" refers to the means which is used in any of the embodiments for providing power to the invention, including battery, solar power, body-heat or -motion generated power, external interface power or any other power sources used in the embodiments. The term "input device" refers to any user input interface which is used in the embodiments, including keypad, touchpad, conformal user input, or any other input device used in the embodiments. The terms "integrated with" and "integrated to" a user's clothing or uniform are used interchangeably, which are used to describe the permanent attachment of the components of the device within the structure or fabric of the user's garment so that it is worn as part of the user's clothing. This is also the meaning of the term "wearable" when describing the invention. The preferred embodiment of the invention uses a backing material on which the components of the device are attached and the backing material is stitched securely within the structure of the article of clothing. The backing material may be made of cloth, a flexible plastic or glass or some other composite material and the term "substrate" is used throughout the description of the invention to refer to the backing material which integrates the components of the device with the article of clothing. This description is not intended to include all possible examples of the backing materials or substrates used with the invention or all possible methods of securing the substrate and device to an article of clothing and any other materials and methods that can be used to integrate the device as part of the user's clothing which are obvious or apparent to a person skilled in the art are intended to be covered by this invention and protected by its claims.

U. S. Army physical security guidelines call for a distance of 100 meters for screening suspicious objects and 200 meters for suspicious vehicles. Additionally, identification distances for tactical units in the field will need to be greater than this to allow for maneuvering and interdiction of potential threats. Typical ranges for military tactical optics are up to 1000 meters. For the purposes of this invention, a "safe" distance is intended to mean a distance at least greater than the effective arms reach distance of an average person, which is generally greater than ½ meter. The maximum effective distance of the current invention is based on the line-of-sight distances of the identification signals used with the device. For lower-powered embodiments, the effective range will cover distances up to 200 meters for security at access points. For operations in the field, the invention will support distances up to 1000 meters when used with tactical equipment. Higher-powered embodiments will support longer distances up to twice the tactical range under good weather and visibility conditions.

The invention consists of the components shown in FIG. 1. 1 is the processor which processes user pass code and other inputs and disables the identification function after a processor managed timeout. The identification signal component 2 is enabled and disabled by the processor 1. One or more identification signals 2 can be included in the design of the invention. The processor 1 and identification signals 2 are connected through a direct electrical connection or through an electronic circuit. The processor 1 provides a timer function which is used to disable the identification signal 2 if the timeout setting of the processor has been exceeded since the user's last pass code input. The processor 1 controls the configuration of the device and monitors the inputs from the tamper-proof features of the device. This information is used by the processor 1 to enable the identification signal 2 after normal start-up and initialization.

The processor 1 processes the changes in tamper-proof inputs and will disable the identification signal 2 if the tampering is indicated.

The processor 1 manages the device power, which is provided by the power source 3. The power circuits on the processor 1 provide regulation, conversion and distribution of power to all other components of the device, including the identification signal 2 and input device 4. The user input 4 which provides a method for entry of the user's pass code is connected to the processor 1. The processor 1 provides an external interface 5 for digital communication or power connections to an external individual combat system.

Figure 2A:
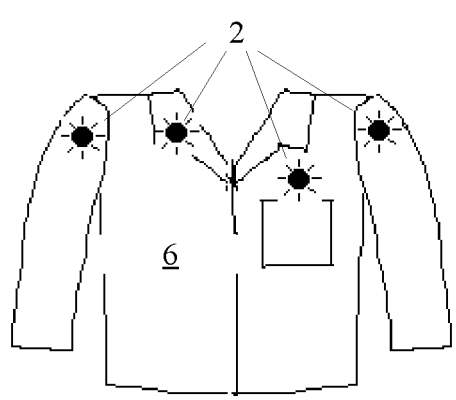
FIG. 2a shows the front of a typical user garment and example locations for the identification signals used by the system.
Figure 2B:
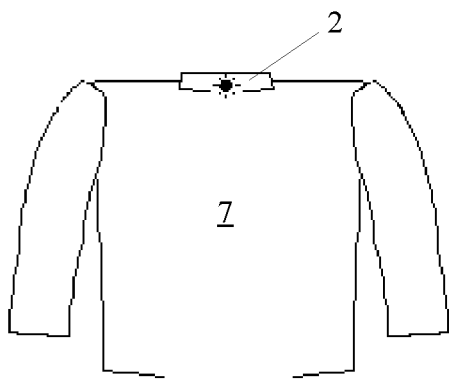
FIG. 2b shows the back of a typical user garment and an example of a preferred location for the identification signals used by the system.

FIGS. 2a and 2b illustrate an example of how the identification signal components of the invention can be placed on a garment for friendly-force identification and intruder detection. The locations shown in these figures are for illustration purposes only. Other locations, numbers and configurations of the identification signals can be made after determining the most effective location for garment type, uniform style and for wearing with other combat or security force gear, such as interceptor body armor vests. Multiple locations in a single user's clothing will be more effective against a single identification signal from being damaged during operations. The intent of this invention is to cover any and all locations, numbers and configurations of the identification signal components of the invention on the user's clothing, including the use of identification signals on any and all other types of garments or equipment such as hats, headgear, jackets, parkas, utility uniforms and coveralls, vests, outer vests, packs, individual weapon systems, individual communication gear and electronics, pants, or other locations. The type of garment has to be large enough to contain the minimum components of the invention including at least one identification signal and the processor as described above or to support connections between these components placed on other user garments. FIG. 2a shows multiple possible locations for the identification signal 2 on the front of a garment 6. The use of FIG. 2b shows how the identification signal 2 can be placed on the back of the garment 7 in a location which will still be plainly visible and effective for all embodiments of the invention, even when individual equipment is carried on the user's back.

Figure 3:
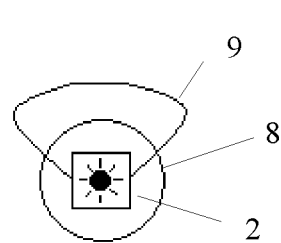
FIG. 3 is an example of a tamper proof feature of the invention.
Figure 4:
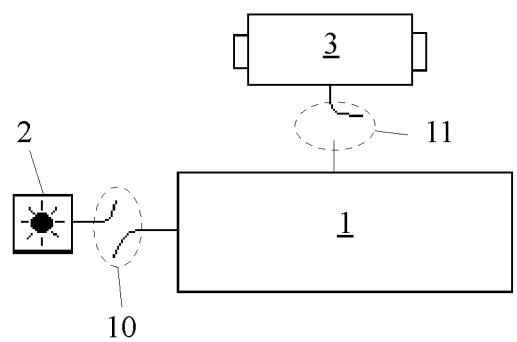
FIG. 4 is an example of how loss of signal connection and loss of power connection can be used as a tamper proof feature of the invention.

FIGS. 3 and 4 show some of the tamper-proof features of the invention. These figures are for illustration only and do not represent all of the possible means for preventing tampering with the device. Any different implementation, application or improvement upon the examples shown in these figures which are obvious or apparent to a person skilled in the art are intended to be covered by this invention and protected by its claims. FIG. 3 shows an example of how an electrically sensitive thread can be used in the construction and attachment of the identification signal component of the invention. In the example of FIG. 3, the identification signal 2 is located within a radius of the garment 8. An electrically-sensitive thread 9 which traverses the radius of the garment 8 is used to detect when the identification signal 2 is removed or cut out of the garment. If an unauthorized user re-locates, alters, or removes the identification signal 2 from the radius of the garment 8 in such a way that the electrically-sensitive thread 9 is broken, the device is designed to interrupt the electrical signal to the identification signal 2 and prevent the unauthorized user to use the device as an intruder without detection.

FIG. 4 is another example of the tamper-proof features of the invention, showing how the loss of connections or power to the processor component of the invention can be used to detect tampering. In FIG. 4, the identification signal 2 is normally connected to the processor 1. 10 represents a loss of signal connection between the processor 1 and identification signal 2. If the processor 1 detects a loss of signal connection 10 to one or more identification signal 2 components, the device can be designed to disable the identification function. This feature can be designed to disable a single identification signal 2 or all identification signal 2 components on the garment. The tamper-proof feature based on a broken electrically-sensitive thread as shown in FIG. 3 can be combined with the loss of connection to the identification signal 2 shown in FIG. 4 to disable the device's identification function if the loss of connection is due to tampering which includes re-locating, altering or removing an individual identification signal 2. FIG. 4 also shows how a loss of connection between the processor 1 and the power source 3 can be used to prevent tampering. 11 represents a loss of power connection to the processor 1 which can occur if the power source 3 is removed or the connection to the power source 3 is broken during tampering by unauthorized personnel. If the processor 1 loses power due to a loss of power connection 11, the processor can be designed to disable the identification function prior to shutdown and to prevent the identification function from being enabled on the next power-up until after the user pass code is authenticated. The processor 1 can also be designed to provide a visible alert signal when tampering is detected from a loss of power connection 11 or a loss of signal connection 10. After a loss of signal connection 10 is detected, the processor 1 can display a visible alert signal using any remaining identification signal 2 components which are still connected. After a loss of power connection 11, the processor 1 can be designed to provide a visible alert signal on the next power-up until the user pass code is authenticated. The processor 1 design can include a visible alert signal by default when the device and its garment is first shipped from the factory to the field in order to provide protection from tampering if the garment is lost or stolen during shipment. This description is not intended to include all possible examples of the tamper-proof features of the invention and any other methods, configurations, or features of the invention that can prevent or discourage tampering which are obvious or apparent to a person skilled in the art are intended to be covered by this invention and protected by its claims.

Figure 5:
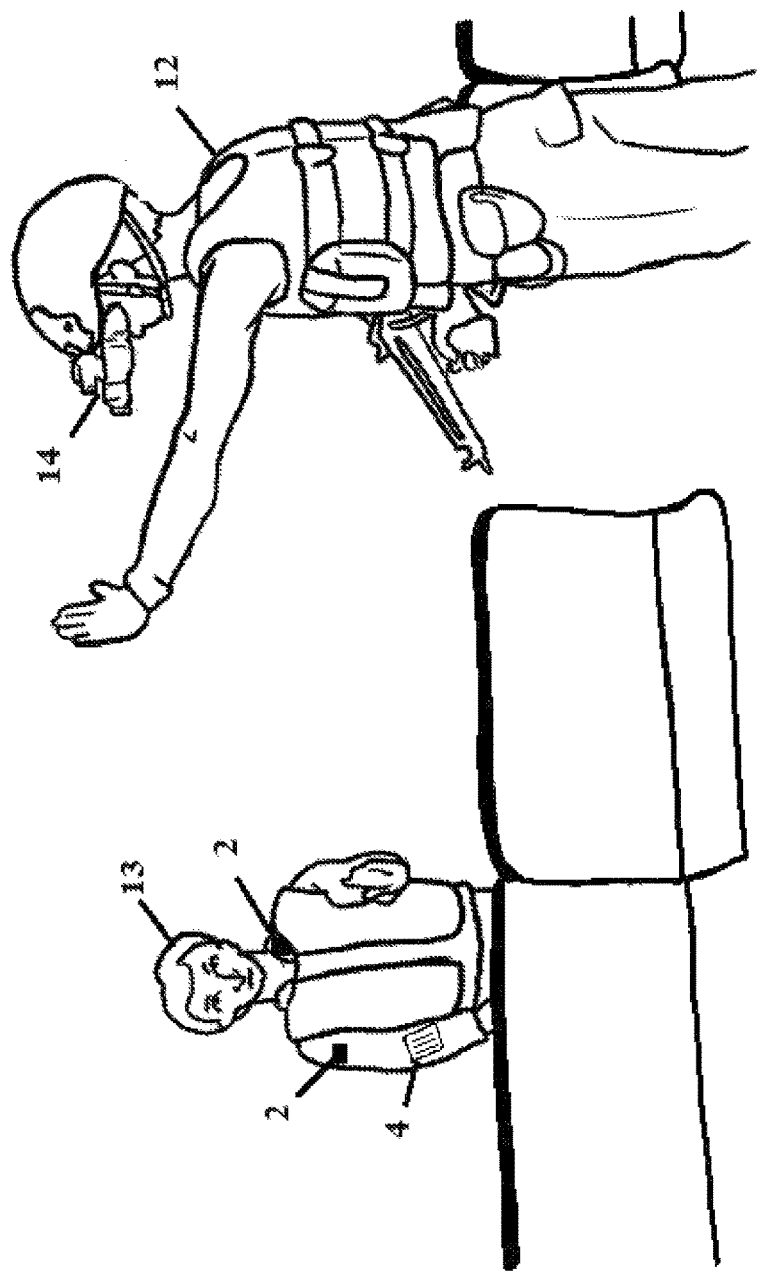
FIG. 5 is representative scenario how an embodiment of the invention is used for identification and intruder detection at an access point or security checkpoint.
Figure 6:
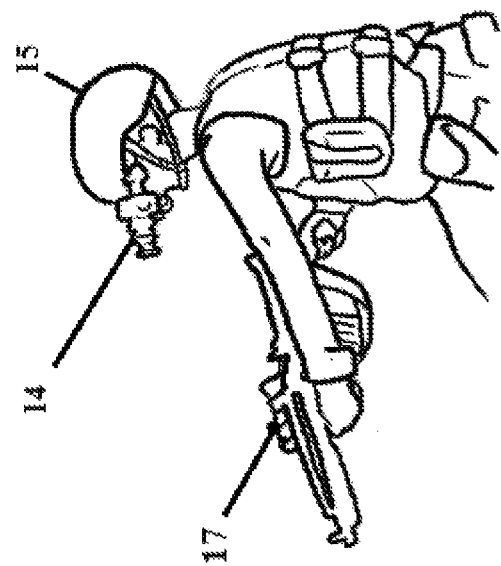
FIG. 6 is a representative scenario for use of the various embodiments of the invention in the field during tactical operations.
Figure 6:
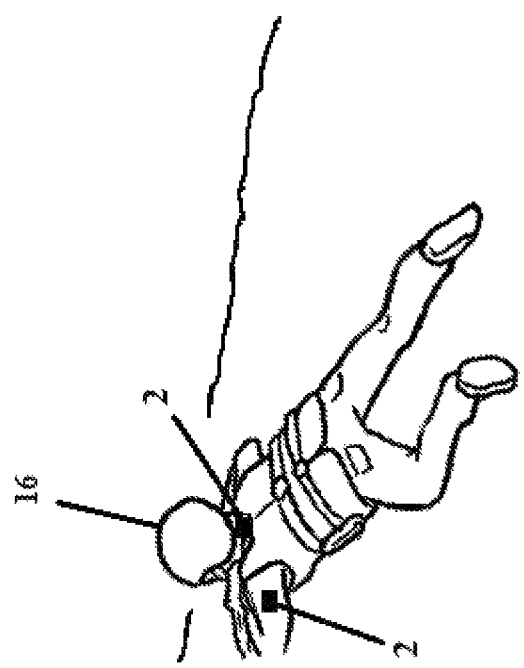

FIGS. 5 and 6 show example use cases for the invention. In FIG. 5, the use of the invention to identify personnel at a security checkpoint. The scenario represented in FIG. 5 includes a sentry 12 at the checkpoint who is observing unidentified personnel 13 as they approach the guard post. The unidentified personnel 13 is wearing an identification signal 2, which is disabled in this scenario. The sentry 12 is following standard operating procedures for the theater of operations, which calls for the use of infrared viewing equipment 14, which is standard equipment for the theater of operations, for identifying friendly-forces and detecting intruders. This can include existing night vision equipment during low light conditions or with daylight filters or a security force can use existing thermal imaging equipment for all times of day. A variety of non-visible signal viewing equipment can be used with the invention depending on the frequency and characteristics of the indication signal 2 used and the intent of the invention is to cover any and all scenarios where a sentry 12 uses such viewing equipment to read the identification signal 2. During this scenario, the sentry 12 will not positively identify the unidentified personnel 13 because his identification signal 2 is not displaying a friendly-force identification signal which is visible in the infrared viewing equipment 14 of the sentry 12. Prior to the unidentified personnel 13 reaching within the safe distance of the checkpoint, the sentry 12 uses applicable rules of engagement to challenge the unidentified personnel 13, interdict him from approaching any closer and request proper identification while still at a safe distance. At this point, a user who is not an unauthorized intruder can re-enter his pass code using the user input device 4, which re-enables the identification function within the device and a non-visible identification signal 2 is displayed. In this case, the sentry 12 is able to see the identification signal 2 using his infrared viewing equipment 14 and the sentry 12 allows the unidentified personnel 13, who has now been identified as friendly, to pass the checkpoint. If the unidentified personnel 13 was not able to enter the pass code or enable identification signal 2 after being challenged in this scenario, the sentry 12 would be able to stop the unidentified personnel 13 and work with local security force to eliminate the threat posed by him before the unidentified personnel 13 could approach to within a safe distance and cause harm to the sentry 12 or others.

This scenario demonstrates the preferred use of the invention when used to identify friendly-forces and detect intruders at a controlled access point or security checkpoint. Unlike badging, biometric and other identification systems and methods from the prior art which require contact with the unidentified personnel 13 or close proximity to him, this scenario demonstrates how the current invention provides a stand-off method for identification of an unidentified personnel 13 at a safe distance. Another novel feature of the current invention which is also demonstrated in this scenario is the use of a non-visible identification signal 2. The embodiment of the invention which uses an infrared non-visible identification signal 2 reduces cost for the security forces using it because this identification method can be used with standard tactical infrared viewing systems available to many security forces. By using an existing tactical viewing system, the embodiment described in this scenario relies on a method which uses a 1-way identification signal. No additional equipment is needed by the checkpoint personnel to interrogate the identification signal 2 of the current invention under this embodiment. Not only is the non-visible identification signal 2 of the invention and the use of a 1-way identification signal 2 a practical and cost saving means of identification, but it is also novel to use non-visible signals integrated within user clothing for intruder detection for several reasons. Unlike all visible identification systems and methods in the prior art, the use of non-visible identification signals 2 by the current invention provides a means of detecting intruders which is not immediately visible or apparent to the intruder. Badges, cards, biometrics and other identification systems based on visible means provide key information to the intruder prior to their attempt to access a secure compound or facility. This prior knowledge which is obvious to the naked eye gives the intruder the opportunity to correct or forge the visible identification means in order to circumvent the security procedures of the opposing force. By relying on a non-visible identification signal 2, the embodiment shown in the scenario above can detect and interdict the intruder when the intruder himself does not even know that his identification is failing to pass. Other non-visible identification systems in the prior art share this feature of the current invention. However, the integration of the non-visible identification signal within the user's clothing is a novel way to prevent misappropriated or fake uniforms from allowing intruders to defeat security checkpoint procedures. A further novel innovation of the current invention shown in this scenario is the use of a pass code protected timeout with the identification signal 2 that is integrated in the uniform. The timeout is a critical novel feature for use with stolen or lost uniforms. Additionally, the pass code capability which allows an unidentified personnel 13 to respond to a challenge by re-enabling the identification signal 2 if it has failed is another key and novel aspect of the current invention. The combination of the non-visible identification signal 2 integrated with the uniform, with a pass code protected timeout is the most novel aspect of the current invention and this makes the combination of features provided in the current invention to be the only effective solution for intruder detection involving stolen or fake uniforms known today. An increase in the number of apparent green-on-blue attacks on security forces which are suspected to have been caused by adversaries or insurgents who are using stolen or fake uniforms has been seen in recent years. The above scenario demonstrates how the current invention provides a novel combination of means of new and other technology which is not obvious in order to directly and effectively eliminate such a threat. The fact that other visible and non-visible technologies in the prior art which are available to security forces today have not provided an obvious and effective solution to this problem which is increasing in war-torn areas makes the case that the novel solution as disclosed in the current invention is needed. If the novel combination of the features used in the current invention were obvious to persons skilled in the art, then security forces somewhere in the world would not be hesitating to implement them in order to deal with this pressing problem and to save lives.

FIG. 6 shows an example of another use for the invention. In FIG. 6, use of the invention for friendly-force identification while operating in the field is demonstrated. In this scenario, a soldier 15 is approaching an unidentified combatant 16 during a tactical operation. The soldier 15 uses his infrared viewing equipment 14, which is standard combat equipment for the theater of operations, to view if the unidentified combatant is displaying an identification signal 2. This can be standard night vision equipment during low light operations, modified night vision equipment for daytime operation, or standard thermal imaging equipment for all times of the day. If the soldier 15 is able to see the identification signal 2 operating normally using his infrared viewing equipment 14, the soldier 15 can use this information with other tactical information to classify the unidentified combatant 16 according to the rules of engagement. Alternatively, if the soldier 15 cannot observe the identification signal 2, the soldier 15 can use this information with other tactical information and use the rules of engagement to either challenge the unidentified combatant 16 or work with known friendly forces to neutralize the threat posed by the unidentified combatant 16. In this scenario, the combat team is using the embodiment of the invention which uses an identification signal 2 combining an infrared signaling component with a reflective signaling component. In this case, the soldier 15 can use the laser range finder equipment 17 which is standard combat equipment carried by his team to interrogate the identification signal 2 on the unidentified combatant 16. If the soldier 15 sees the identification signal 2 while shining his laser range finder equipment 17 on unidentified combatant 16, he can use this information with other tactical information to classify the unidentified combatant 16 according to the rules of engagement. If the soldier 15 cannot observe the identification signal 2 after shining the identification signal 2 with his laser range finding equipment 17, the soldier 16 can use this information with other tactical information and use the rules of engagement to either challenge the unidentified combatant 17 or work with known friendly forces to neutralize the threat posed by the unidentified combatant 17.

Just as with the scenario described FIG. 5, the scenario described in FIG. 6 demonstrates how the novel combination of the innovations of the current invention can be used effectively for friendly-force identification and detection of adversaries in the field during a tactical operation. The threat of adversaries or insurgents using stolen or fake uniforms does not just apply to garrison or security checkpoint operations. This threat extends to operations in the field when adversaries or insurgents may be conducting infiltration operations during an engagement. Other combat identification technologies for individual combatants have been described in the prior art. None of these are designed to deal with adversaries or insurgents who are using uniforms or friendly-force technology to pose as friendly forces. The fact that uniforms, equipment and identification systems which are compromised by opposing forces can be used to infiltrate friendly-forces and do great harm has been known for some time. The scenario in FIG. 6 demonstrates how the novel combination of features in the current invention deals with this problem in a unique and effective way. By combining a pass code protected, time-limited, non-visible identification signal 2 which is integrated in the organization's combat uniform, the current invention provides a novel means of intruder detection, even if an adversary's combatants have compromised other friendly equipment or identification systems. In this scenario, the unidentified combatant 16 can be identified as a hostile or friendly from whether the identification signal 2 of this invention is found to be integrated within the combatant's uniform. Even if the unidentified combatant 16 has obtained a friendly IFF system during the battle and is compromising the friendly combat identification system, the soldier 15 can still use the current invention to determine the unidentified combatant's 16 true identification depending on whether the unidentified combatant's uniform displays the proper identification signal 2. This scenario also shows how the current invention can combine the embodiment using a reflective identification signal 2 with the non-visible identification signal 2 of the preferred embodiment. The reflective identification signal 2 which is based on reflection of laser light from existing tactical equipment is an example of adding a 2-way identification method to the 1-way method using the non-visible identification signal 2 of the preferred embodiment. Other 2-way identification systems based on the reflection of visible and non-visible signals are found in the prior art. The embodiment of the current invention which includes a 2-way identification method using a reflective identification signal 2 is a novel combination of a 2-way method with the reflective identification signal 2 that is pass-code protected, time-limited and integrated with the uniform of the unidentified combatant 16, which is not found in the prior art nor known to be used to solve this problem in the field today.

FIGS. 5 and 6 represent typical scenarios demonstrating possible uses for the invention. These scenarios are not intended to be exhaustive examples nor to cover all possible uses of the invention with normal individual combat or other equipment. Other uses and applications for the invention which are not represented by or shown in FIGS. 5 and 6 nor contained within their descriptions will be obvious and apparent by persons skilled in the art after reviewing this disclosure and its description, specifications and claims. It is the intention of this invention that any and all such other uses or applications of the invention are covered within the scope of the invention and are protected by the accompanying claims.

Figure 7:
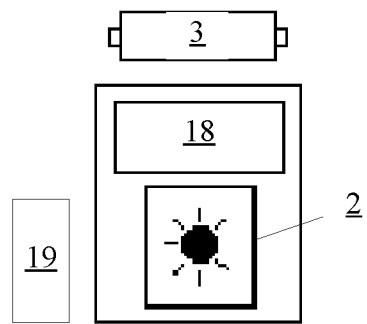
FIG. 7 is an example of embodiments using on-board processor technologies and integrated components for a very small sized embodiment of the invention.
Figure 8:
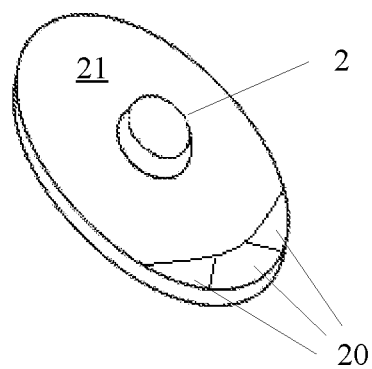
FIG. 8 shows an example of an embodiment based on a very small sized device with the user input devices integrated into a conformal input surface on the device assembly.

FIGS. 7 and 8 show views of the invention which help describe additional embodiments. In FIG. 7, the identification signal 2 is integrated with the processor component of the device which has been implemented as an on-board processor 18. The on-board processor can be a PLD, FPGA or ASIC processor in the embodiment of the invention which uses these technologies. The on-board processor can also be fabricated on the same substrate as a light emitting diode used for the identification signal 2 to integrate these functions using MEMS technology in an alternative embodiment using MEMS technology for a low-power device. FIG. 7 also includes a power source 3, which can be separate or integrated with the identification signal 2 package, depending on the embodiment. For an embodiment comprising an extremely small or extremely low-power device, the power source 3 can be a small battery which is integrated with the identification signal 2 package. For the low-power embodiment, thermoelectric or piezoelectric MEMS technology which is integrated with the on-board processor 18 and identification signal 2 can be used to allow use of body heat or motion as the power source 3.

FIG. 7 also contains a user input function 19, which can be an user input surface or an interface to an external user input equipment or other system which provides user input. For the extremely small or low-power embodiments, the user interface function 19 can be integrated on-board with the other components of the identification signal 2 package. FIG. 8 shows one example of how a user input surface 20 can be integrated with the identification signal 2. In this view, 3 buttons are integrated on the identification assembly 21 and are covered with a conformal surface. The user can press on these surfaces in order to use the buttons for entry of his pass code or other required user inputs.

Figure 9:
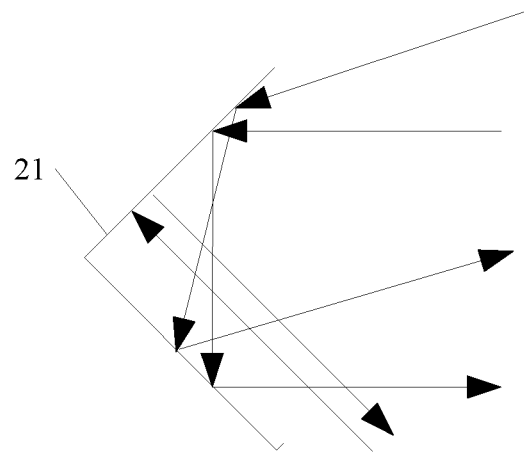
FIG. 9 is an example of how retro-reflective technology can be used for identification with some embodiments of the invention.
Figure 10:
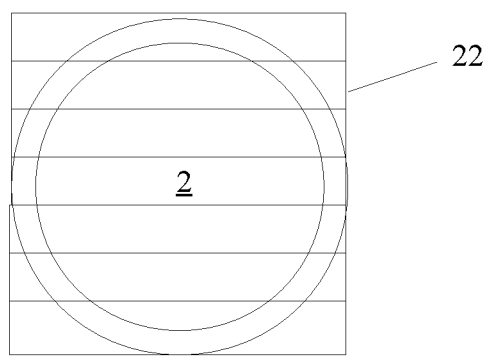
FIG. 10 is an example of how retro-reflective or other reflective technologies can be used with the other features of the invention in some embodiments.

FIGS. 9 and 10 show examples of features supported by the embodiment of the invention which uses reflective surfaces for identification signaling. In FIG. 9, an example of a retro-reflective surface 21 is shown. The embodiment of the invention which uses reflective surfaces can use a retro-reflective surface 21 or simple planar reflective surface for identification. The retro-reflective surface 21 is designed to reflect light at the same angle of incidence as that of the source beam of light, except in the opposite direction. FIG. 9 shows three examples to demonstrate how the example of a retro-reflective surface 21 can reflect a beam of light coming from an external light source. In each case, the beam is reflected one or more times and returns at the same angle of incidence of the original light source but in the opposite direction. This type of reflective surface improves the ability of a person shining a light source on the device to see a return signal and identify the user. By returning the light along the axis of the original source of the light, this type of reflector also limits scattering of the light signal and decreases the probability of intercept in a hostile combat environment. The use of retro-reflective surfaces 21 and other reflective surfaces are found in other identification systems disclosed in the prior art. However, the combination of these types of surfaces or any reflective surfaces as part of a system which is integrated with the user's clothing and provides a pass code protected, time-limited means of identification which allows intruder detection using these reflective surfaces is a novel use of these surfaces for identification which is unique to the current invention.

FIG. 10 shows how the current invention uses a reflective surface such as the retro-reflective surface 21 in one embodiment of the invention with pass code protections and time limits for friendly-force identification and intruder detection. In this embodiment, the identification signal 2 is generated by a retro-reflective surface 21, planar, or other reflective surface. This embodiment combines an electronically controlled window 22 over the identification signal 2. The electronically controlled window 22 is made of a material which will change its transmission properties of light when a voltage is applied by the device. This can include a layer made of smart glass materials including suspended particle, electrochromic, polymer dispersed liquid crystal diode (LCD), or non-crystal materials, or it can be made of thin film LCD, or other materials. The properties for the layer will be chosen so that the transparency of the electronically controlled window 22 can be changed from near fully transparent to completely blocking the visible or non-visible identification signal 2 for the frequency of signals used. The electronically controlled window 22 allows this embodiment to use a low voltage to change the transparency to a level which blocks the identification signal 2 when the device disables the identification function after the timeout has expired or tampering is encountered. Similarly, a low-voltage can be used in this embodiment to change the transparency of the electronically controlled window 22 to near fully transparent after the user enters a pass code to re-enable the identification signal 2. For the low-powered embodiment of the invention, the electronically controlled window 22 can be made of a material which changes its transmission characteristics when a low voltage is applied but retains its transparency setting after the voltage is removed.

The technologies described with the views shown in FIGS. 9 and 10 are included in the prior art. The combination of these technologies to create a novel identification system based on a low-cost, wearable, non-visible, pass-code protected, time-limited identification signal which can be used with existing security force equipment is not found in the identification and intruder detection tactics and procedures being used by security force personnel today nor obvious to someone skilled in the art of identification or intruder detection applications.

Figure 11:
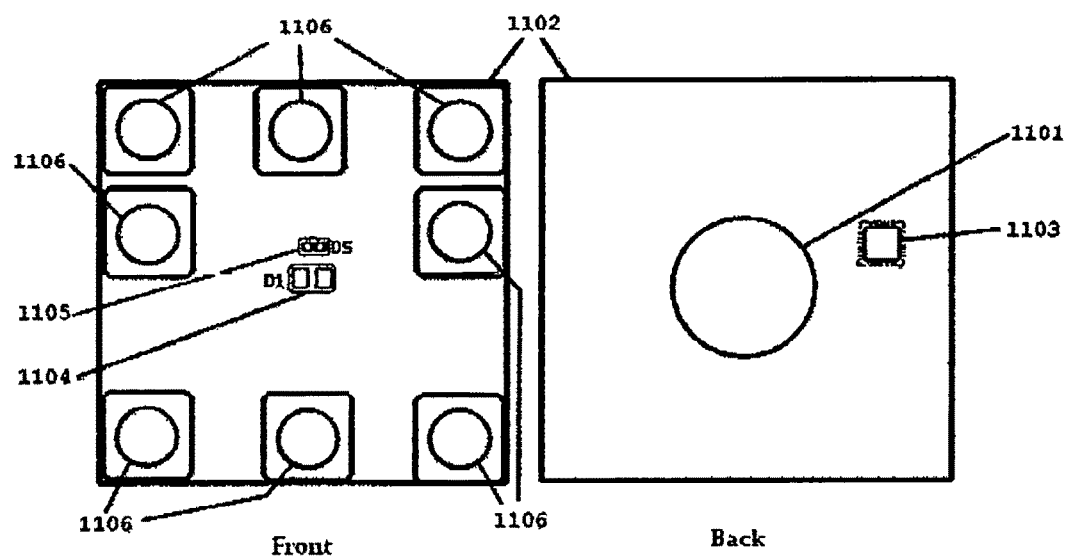
FIG. 11 is a picture showing the prototype of the preferred embodiment of the invention.

FIG. 11 shows a working prototype of the preferred embodiment of the invention. In this embodiment, a 3 Volt CR2032 Lithium Battery 1101 is used as the power source. The prototype in FIG. 11 uses an FR-4 printed circuit board fabricated with standard etching techniques to produce a rigid substrate 1102 for the device circuits. This substrate 1102 which is not shown integrated with the uniform in FIG. 11 is a prototype for the preferred embodiment. The preferred embodiment does not use a rigid substrate as shown in FIG. 11, but is based on a cloth or flexible backing material as a substrate that will be integrated fully in the uniform. The power source in FIG. 11 is connected to an Atmel ATTiny88-MU 8-bit microprocessor 1103, an HSDL-4400 IR emitter 1104 and LTST-C191KRKT Super Red LED 1105. The IR emitter 1104 is a prototype for the non-visible identification signal used in the preferred embodiment of the invention. The Red LED 1105 is used for programming of the PIN code used for authentication and tamper-proofing in the preferred embodiment of the invention. The Red LED 1105 was used with this prototype in order to improve viewing of the programming signals by the user during all outside lighting conditions. Multiple B3F-4000 Tactile (Button) Switches 1106 are shown in FIG. 11, which are used for the user input device of the preferred embodiment of the invention. The ATTiny88 8-bit microprocessor 1103 comprises an 8K byte flash programming memory, which is used to load and store prototype software programs. An Atmel AVRISP programmer was used to load prototype software onto the ATTiny88 microprocessor 1103 via the processor's SPI serial interface. GPIO outputs of the ATTiny88 microprocessor 1103 are used to drive the identification signals on the IR emitter 1104 and the user interface signals which are displayed on the Red LED 1105. The time-limited tamper-proofing of the preferred embodiment of the invention is implemented using the 16-bit timer of the ATTiny88 microprocessor 1103. Other tamper-proofing features of the invention are implemented or can be added in the software loaded on the processor in FIG. 11 and by using the 64 byte EEPROM of the ATTiny88 microprocessor 1103, said tamper-proofing including one or more of the following features:

A number of authentication attempts fail when the processor is processing user input;

The timeout expires since the last successful authentication attempt;

The processor detects the loss of connection the processor component and one or more of the identification components;

The processor detects the loss of power;

The processor self tests or checksums fail during start-up, re-start or user initiated diagnostics;

The processor detects unexpected changes in software, firmware or hardware;

Processor exceptions or errors occur;

The processor disables the identification function when tampering is detected;

The device displays a non-visible or visible alert signal after tampering is detected.

The two forms of tamper-proof protections included in the preferred embodiment of the device are based on authentication of the user password or pass code and a timeout which expires if a fixed amount of time has expired since the last successful user authentication. The prototype in FIG. 11 requires an authentication password or code to be entered by the user in order for the generation of the identification signal to be enabled. In this embodiment, detection of tampering will be determined if the program fails to authenticate a user's input after three attempts. After detection of tampering, the device disables generation of the identification signal so that the device cannot be used or exploited by a user who does not know the authentication codes. An alternate embodiment displays an alert signal following detection of tampering due to the failure for the user to authenticate. Additionally, the preferred embodiment of FIG. 11 includes a timer which is programmed with a timeout. The timeout is set to expire at a fixed time, for example 24 hours, after the last successful user authentication. If the user authenticates again prior to expiration of the timer, the timer is reset and the length of time prior to the timeout is extended to its full value. If the timeout expires without a re-authentication of the user, the device will treat this as tampering by disabling the generation of the identification signal. An alternate embodiment can display an alert after tampering is detected after the timeout.

The invention comprises a number of embodiments for the detection of tampering in addition to the two just described for the preferred embodiment of the invention. Any of these alternate embodiments for tamper-proofing and detection can be combined to provide increased security against tampering. Each type of detection of tampering has been disclosed in the detailed description above. Each type of detection is further described here. Even though there may be a more detailed description of the tamper-proofing and detection used in the invention, the substance of this information was already disclosed in the original patent and none of this is new matter.

Detection of the removal of the device which is integrated with the uniform or article of clothing is an important embodiment which prevents tampering and exploitation of the device. One embodiment uses electrically-sensitive thread to detect tampering. This thread can be used to secure the device directly to the clothing or it can be used for as stitching which circumscribes the device. By passing a current through this thread either continuously or periodically, the device can detect when the thread is cut by an adversary who is trying to remove and exploit the device. The processor can be used in this embodiment to detect when the thread is cut by connecting two ends of the thread to different input/output pins. In this embodiment, the processor can detect a voltage change when the thread is cut or the loss of a sensing current. Either implementation would lead to the disabling of the generation of the identification signal or display of an alert.

Figure 12:
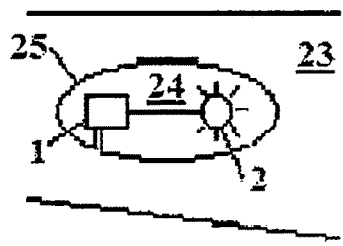
FIG. 12 is an example of detection of tampering using an electrically-sensitive thread

FIG. 12 shows an example of this embodiment. In FIG. 12, the flexible or cloth substrate 24 is attached to a part of the uniform 23. The electrically-sensitive thread 25 is used to attach the substrate 24 to the uniform 23 with the thread 25 circumscribing the processor 1 and identification signal 2 in this embodiment. As shown in FIG. 12, two ends of the electrically-sensitive thread are connected to input pins of the processor 1. These inputs are used to sense whether the thread has been cut in order to detect tampering. The example in FIG. 12 represents a simple attachment of the device substrate 24 to the uniform 23 without specifying the type of stitch used.

Figure 13:
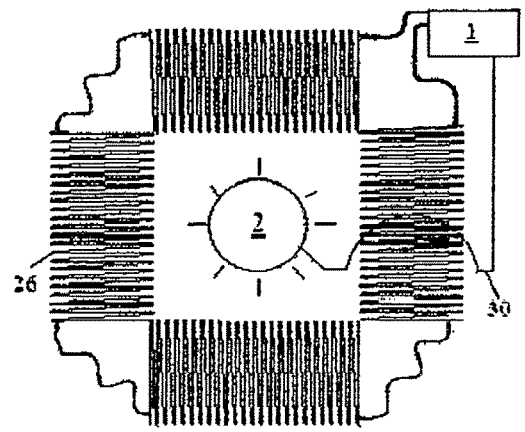
FIG. 13 is an example of the stitching pattern used with an electrically-sensitive thread for detection of tampering.

Other embodiments of the device can use the electrically-sensitive thread with different stitching patterns to increase its effectiveness at detecting tampering. For example, an exaggerated Herringbone or more traditional Satin stitch could be used to cover more area around the device. FIG. 13 shows an electrically-sensitive thread pattern 26 which surrounds an identification signal 2 using one of these larger area patterns. The electrically-sensitive thread shown in the stitching pattern 26 of FIG. 13 is connected to the input pins of the processor 1 for detection of a break in the thread caused by tampering with the identification signal 2 or the area around it. As shown in FIG. 13, the area covered by the thread is much greater using this pattern 26 and the likelihood that this thread is cut when the attached device is altered or removed increases with the greater area covered by the thread. When any part of the electrically-sensitive thread pattern 26 is cut due to tampering, the open circuit between that part and the processor 1 pins forces the voltage across the pins of processor 1 high. This high voltage can be read by the processor 1 and the processor can disable the identification signal 2 or take other action to protect against tampering. The conductor 30 is the signal connection between the identification signal 2 and the processor 1. The example in FIG. 13 shows how the stitching of an electrically-sensitive thread in a pattern 26, or other similar area pattern, provides protection against attempts to remove the identification signal 2. Even if an unauthorized person attempts to remove the identification signal 2 and processor 1 from the article of clothing in which it is integrated by cutting along the length of the conductor 30, there is no way to avoid cutting through the electrically-sensitive thread pattern 26 and prevent the triggering of the detection of tampering by the processor 1.

An alternate embodiment of the detection of tampering due to removal or attempted removal of the device from the clothing in which it was integrated is through the detection of the loss of power or the power source. This would occur if the device is separated from its power source during removal. This embodiment would behave similarly to the more general case of detecting tampering due to any loss of power, which is discussed next.

Figure 14:
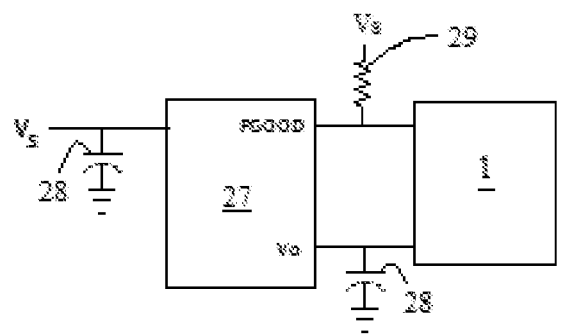
FIG. 14 is an example of a circuit diagram which detects tampering due to loss of power or power source.

One embodiment can detect tampering with the power source or due to a loss of power. An adversary may try to reset the device by removing or disconnecting the power source. A stolen or pilfered uniform may have a depleted power source, which an adversary may try to replace or re-charge. This embodiment uses persistent storage to change a bit on low voltage in a processor or external memory device which can be used to detect tampering when power is restored. After tampering is detected due to the loss of power, the device disables the generation of the identification signal or generates an alert signal on the next power-up of the device. FIG. 14 shows an example of this embodiment. In FIG. 14, processor 1 is connected to a voltage regulator 27 with a "Power Good" output signal, PGOOD. The voltage source, Vs, is input to the voltage regulator 27 and the PGOOD output is connected to an input on the processor 1. During normal use, the voltage regulator 27 provides output voltage, Vo, to the processor 1 to operate the device. The processor 1 in this example preferably uses the PGOOD output of the voltage regulator 27 to sense the validity of the output voltage, Vo, of the voltage regulator 27. A high PGOOD signal indicates that the Vo voltage is at its rated voltage level. A pull-up resistor 29 keeps this signal high when the PGOOD output indicates a good voltage output of the voltage regulator 27. If the device is removed from the power source which provides Vs, the PGOOD signal will toggle when the Vo output decays to a low voltage and the processor 1 can sense this change, using a software interrupt to write a flag to persistent memory. An interrupt is required to handle this condition immediately, before the Vo voltage decays to zero. Once power is restored, the processor 1 can read the flag written to persistent memory and use this to detect tampering due to a loss of power or change in the power supply. After detection of tampering, the device can disable the generation of the identification signal or display an alert signal. Power conditioning capacitors 28 are also shown in FIG. 14 to indicate which lines are power buses.

Figure 15:
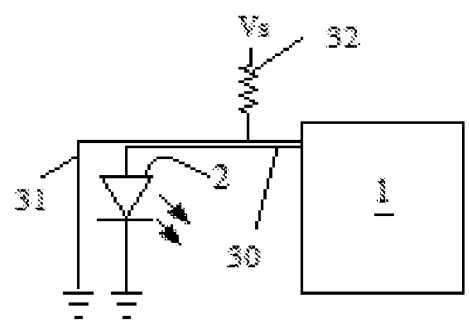
FIG. 15 is an example of a circuit diagram which detects tampering due to the loss of connection to the identification signal.

Another embodiment of tamper-proofing detects tampering if the connection between the processor and one or more identification signals is broken. This tamper-proofing can be designed as a run-time capability or it can be based on persistent storage so that a loss of connection can be detected after the device wakes up from a suspend state. For detection of a loss of connection, the electrical connections can be instrumented with an additional conductive circuit which is tied to an Analog-to-Digital converter pin of the processor. A pull-up resistor can be connected so that the processor will detect when the line is broken by reading a high voltage. If a broken connection is detected, the processor can disable generation of the identification signal at other locations (for a multiple identification signal device) or disable the signal on the line which was cut so that it cannot be used if the connection is restored. Similarly, the device can also generate an alert on other identification signal emitters following detection of tampering due to a loss of connection or generate an alert on the identification signal on the broken line should the line be restored later. FIG. 15 shows an example of this embodiment. In FIG. 15, the processor 1 is connected by a first conductor 30 to the identification signal 2, which is shown as an LED. The additional conductive circuit is implemented in FIG. 15 by running a second conductor 31 along the path of the first conductor 30 which connects to the identification signal 2. The second conductor 31 is an additional line for detecting tampering, which is connected to an input pin of processor 1 and processor 1 contains an Analog-to-Digital conversion module that can translate the voltage on that pin into a digital input. A pull-up resistor 32 is used to force the input high if tampering with the connection to the identification signal 2 is detected by a break in the second conductor 31.

The example of FIG. 15, which shows how to detect tampering when an identification signal is removed from the clothing which integrates the current invention differs from the example of FIG. 13, which uses an electrically-sensitive thread. The example in FIG. 15 adds a conductor for detection of tampering along the length of the wire connecting the identification signal to the processor. Conversely, the electrically-sensitive thread in the thread pattern shown in FIG. 13 is used to detect tampering around the area of the identification signal and not along the length of its connection to the processor.

Detection of tampering due to changes in the device software is another embodiment of the tamper-proofing. An adversary may try to replace the software used on the processor or add a patch or malware. Also, tampering with the device or the device software may lead to software program corruption. This embodiment can detect this type of tampering through the use of software checksums, which check the code and read-only data. During start-up, the device software can run Built-in-Tests which calculate the checksum for key parts of the program and compare this checksum to the known values of valid checksums, which are stored in read-only memory. The configuration data for the device software can be checked for valid versions and dates. If a configuration check or checksum verification of a portion of the software program detects code or data changes, the processor can disable the generation of the identification signal or generate an alert. An alternate embodiment would allow the checking of software checksums during user initiated diagnostics.

Figure 16:
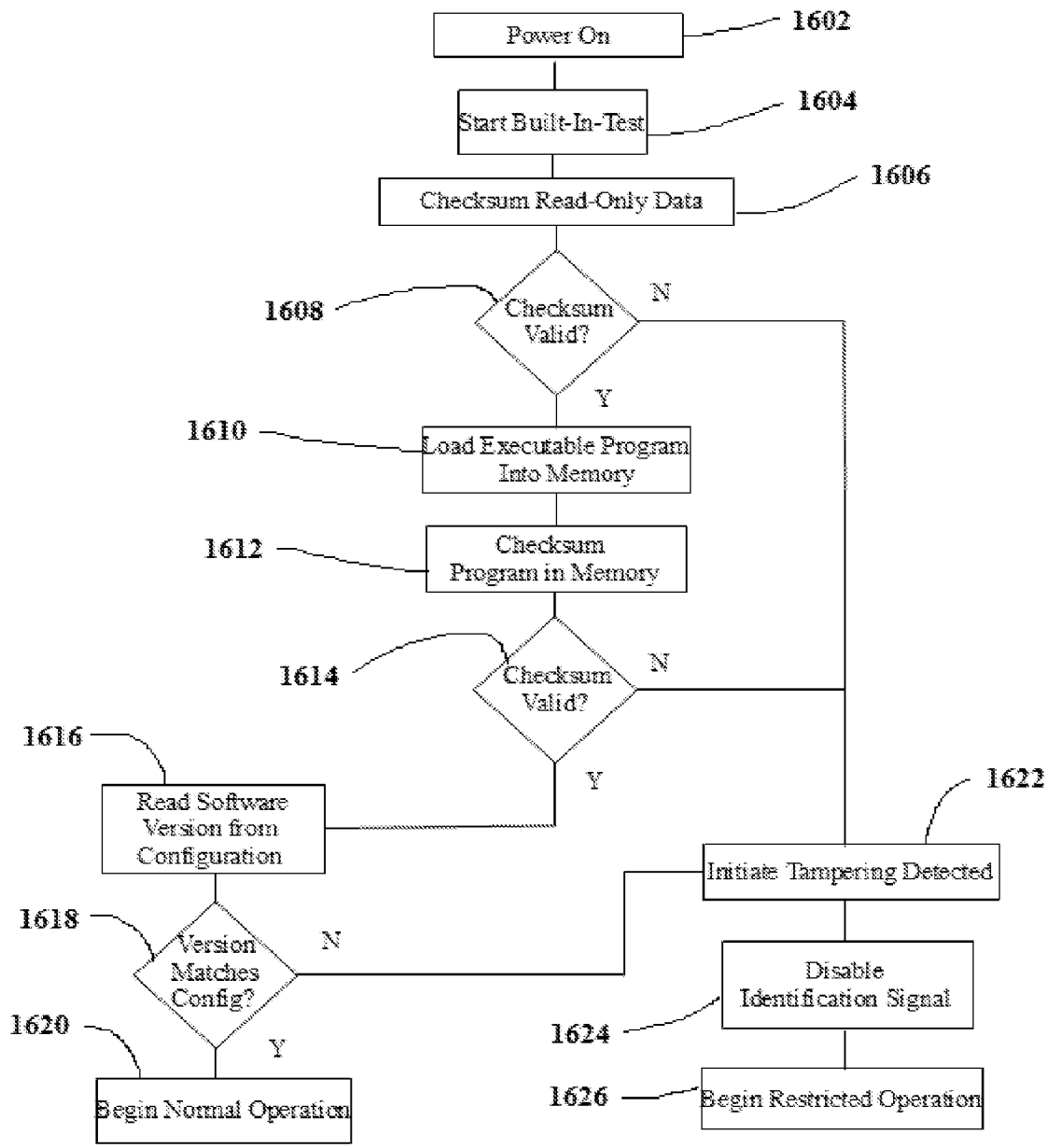
FIG. 16 is an example flow diagram for an embodiment which detects tampering due to changes in the software program.

FIG. 16 shows an example of the detection of tampering in this embodiment through the use of a software checksum verification as part of Built-in-Test on start-up of the device. Various checksums can be used for detection of tampering such as simple additive checksums or more sophisticated error checking algorithms. In this example, a 32-bit cyclic redundancy check based on the IEEE 802.3 CRC-32 standard is used for all checksum steps. In FIG. 16, the device starts Built-in-Test in step 1604 after power is applied in step 1602. The boot program first performs a checksum in step 1606 on its data in read-only memory to check for any corruption or persistent memory changes. Step 1608 determines whether the checksum is valid. If that check passes, the executable software program is loaded into memory in step 1610 and a checksum is performed on the program in step 1612. Step 1614 determines whether the checksum for the program is valid. If a good checksum is verified for the executable program, the program checks its version numbers with the version in the device's configuration data in step 1616. Step 1618 determines whether the version matches the configuration data. If the version matches, the software program begins normal operation in step 1620. However, if a previous checksum or version check failed at any point in steps 1608, 1614, or 1618, this would initiate tamper detection routines in step 1622, which would disable the generation of the identification signal in step 1624 and begin restricted program operations in step 1626 for this embodiment due to the detection of tampering related to software program changes.

In addition to software changes, unauthorized users can also tamper with the configuration or components of the device. A different embodiment of the invention can protect against this type of tampering by using the software program to check for a valid configuration of the processor and its related components. With the device configuration stored in persistent memory of the device, the software program can read this configuration on start-up and perform checks to verify that the configuration is present or working. This can include part numbers of the device components as well as detecting if interfaces to the processor are installed and working. If tampering with the device or processor configuration is detected, this embodiment can disable the generation of the identification signal or display an alert signal.

Software fault detection is another embodiment of tamper-proofing. The software program can be designed with hardware and software interrupts so that if a software fault leads to an exception, the interrupt handler will implement tamper proofing actions. Software faults related to tampering may arise due to exceptions in parts of the software program which have been replaced or corrupted, such as divide-by-zero or access violation exceptions. Also, resets or watchdog timer exceptions can be designed to protect against parts of the program which fail to execute due to tampering or corruption. The software program can use interrupt handlers to place the device in a known condition after a fault, including disabling of the generation of the identification signal or display of an alert signal after tampering has been detected.

Multiple combinations of the foregoing types of tamper-proofing and detection of tampering and various other embodiments of similar technologies and methods can be suggested by this disclosure to a person of ordinary skill in the art and the intention of this invention is that any and all other such tamper proofing and detection of tampering are covered within the scope of the invention and are protected by the accompanying claims.

CITATION LIST

Patent Literature

EP2619558 (A1) Rayner
MX2012010644 (A) Katowski et. al.
MX2012010642 (A) Gray et. al.
U.S. Pat. No. 8,462,042 Delong & Blythe
U.S. Pat. No. 8,184,981 Ivtsenkov et. al.
U.S. Pat. No. 8,135,112 Hughes
U.S. Pat. No. 7,796,733 Hughes
U.S. Pat. No. 8,115,697 Hayles & Omara
U.S. Pat. No. 7,196,655 Hayles & Omara
U.S. Pat. No. 8,111,156 Song
U.S. Pat. No. 7,983,565 Varshneya
U.S. Pat. No. 7,898,385 Kocher
U.S. Pat. No. 7,889,053 Mcgrath & Talukder
U.S. Pat. No. 7,849,619 US2007017136 (A1) Mosher et. al.
U.S. Pat. No. 7,204,425 Mosher et. al.
U.S. Pat. No. 5,973,600 Mosher et. al.
U.S. Pat. No. 7,831,150 Roes et. al.
U.S. Pat. No. 7,308,202 Roes et. al.
U.S. Pat. No. 7,809,109 Mastronardi et. al.
U.S. Pat. No. 7,796,734 Mastronardi et. al.
U.S. Pat. No. 7,593,506 Mastronardi et. al.
U.S. Pat. No. 7,505,562 Mastronardi et. al.

U.S. Pat. No. 7,605,709 Toliver
U.S. Pat. No. 7,494,061 Reinhold
U.S. Pat. No. 7,365,536 Crowley and Lathrop
U.S. Pat. No. 7,336,189 Thomas
U.S. Pat. No. 7,316,358 Kotik et. al.
U.S. Pat. No. 7,224,308 Butler
U.S. Pat. No. 6,871,287 Ellingson
U.S. Pat. No. 6,816,106 Butler
U.S. Pat. No. 6,701,649 Brosi
U.S. Pat. No. 6,655,585 Shinn
U.S. Pat. No. 6,593,852 Gutta et. al.
U.S. Pat. No. 6,421,453 Kanevsky et. al.
U.S. Pat. No. 6,119,096 Mann et. al.
U.S. Pat. No. 6,097,330 Kiser
U.S. Pat. No. 6,018,739 Mccoy
U.S. Pat. No. 5,973,598 Beigel
U.S. Pat. No. 5,966,226 Gerber
U.S. Pat. No. 5,929,777 Reynolds
U.S. Pat. No. 5,819,164. Sun et al.
U.S. Pat. No. 5,686,722 Dobois et al.,
U.S. Pat. No. 5,648,862 Owen
U.S. Pat. No. 5,459,470 Wooton et al.
U.S. Pat. No. 5,414,405 Hogg
U.S. Pat. No. 5,299,227 Rose
U.S. Pat. No. 5,229,764 Matchett et. al.
U.S. Pat. No. 5,274,379 R. Carbonneau et al.
U.S. Pat. No. 5,056,141 Dyke
U.S. Pat. No. 4,955,000 Nastrom
U.S. Pat. No. 4,837,568 Snaper
U.S. Pat. No. 4,851,849 Albersdoerfer
U.S. Pat. No. 4,694,297 Alan Sewards,
WO02084324 (A1) Tatum et. al.
WO0133748 (A1) Radomsky
CN102324010 (A) Huaijiang et. al.
US2010219241 (A1) Corwin et. al.
DE202005007113 (U1) Treptow
EP0138525 (A2) Rudland
GB 1044443 (A) Atomic Energy Commission
US20120189312 Maryfield et. al.
US20090045996 Ivtsenko
US20060087410 Garcia et. al.
20150265860 Kennedy et al
20130109427 Matus Non Patent Literature Last, F. M. (Year, Month Date Published). Article title. Magazine Title, Page(s). Retrieved from URL.
Dyster, J. (2011, May) Advancements in modular wearable computing solutions for the dismounted warfighter. *Government Security News*, Pages 1-2. Retrieved from http://www.gxnmagazine.com/node/23212.
AFRL Develops Friend-Versus-Foe Identification System. (2008, February) *Wright Patterson Air Force Base News*, Page 1. Retrieve from http://www.wpafb.af.mil/news/story.asp?id=123085168.
Using Wearable Biometrics for Continuous Automated Authentication. (n.d.) Retrieved Oct. 31, 2013, from http://www.jhuapl.edu/ott/technologies/technology/articles/P02190.asp
High Speed Flash Imaging Laser Vibrometer for the Detection of Suicide Bomber IEDs (SBIEDs). (2010) Retrieved Oct. 26, 2013, from http://www.sbir.gov/sbirsearch/detail/1297.
Compact, wearable IFF laser beacon with enhanced data transmission capability. (2011) Retrieved Oct. 31, 2013, from http://www.sbir.gov/sbirsearch/detail/384083.

What is claimed:
1. A tamper-proof identification device comprising:
an article of clothing;
a substrate secured to the clothing as an integral part of the clothing;
a user interface mounted on the substrate for entering a pass code and generating an input signal;
a processor mounted on the substrate to receive the input signal from the user interface and verifying the pass code, and to provide an identification signal to verify that the user of the article of clothing is an authorized user;
a power source coupled to the processor;
a timer coupled to the processor and substrate to determine an elapsed time from the verification of the pass code; and
a tamper-proof detection configured to:
  detect removal of the device from the article of clothing;
  detect a loss of connection to the components emitting the identification signal;
  detect a power source failure;
  detect a change to the processor on power-up;
  detect a number of failed attempts to authenticate the user's pass code;
  detect a change to the software; or
  detect a software failure;
wherein the identification signal is only generated when the processor verifies that the entered pass code is valid and the elapsed time determined by the timer has not exceeded a predetermined time, and the tamper-proof detection has not detected tampering.
2. The device of claim 1 wherein the identification signal is infrared light.
3. The device of claim 1 wherein the identification signal is ultraviolet light.
4. The device of claim 3 wherein the ultraviolet light signal is limited in characteristics to minimize hazards to observers, said characteristics comprising power, frequency, modulation, or duration.
5. The device of claim 1 wherein the identification signal uses radio-frequency identification operating in beacon or active mode.
6. The device of claim 1 wherein the identification signal is visible light.
7. The device of claim 1 further comprising:
a reflective surface which reflects an interrogation signal and uses the reflected signal to generate the identification signal in response to sensing the interrogation signal;
a material covering the reflective surface wherein the processor adjusts the properties of the material to disable the return signal if the processor does not verify that the entered pass code is valid, or the elapsed time determined by the timer has exceeded a predetermined time, or the tamper-proof detection has detected tampering, said property changes comprising:
  the material changes from near-fully transparent to fully opaque to disable the identification signal;
  the material changes from fully opaque to near-fully transparent to enable the identification signal;
  the position of the material moves to disable or enable the identification signal;
  the shape of the material changes to disable or enable the identification signal.
8. The device of claim 7 wherein the reflective surface is a retro-reflective surface.

9. The device of claim 7 wherein the reflective surface reflects non-visible light for identification.

10. The device of claim 9 wherein the identification signal generated by reflection is infrared.

11. The device of claim 9 wherein the identification signal generated by reflection is ultraviolet.

12. The device of claim 1 wherein the range of identification is up to 2000 meters.

13. The device of claim 1 wherein the processor receives an input through the user interface and uses the input to verify that the user is an authorized user, said input comprising:
    password;
    personal identification number;
    thumbprint; or
    fingerprint.

14. The device of claim 1 wherein the device generates an alert signal when the processor disables the identification signal.

15. The device of claim 1 wherein an alert is generated after power is applied for the first time and the processor disables the alert after the processor verifies that a predetermined pass code is entered through the user interface by the user.

16. The device of claim 1 wherein the characteristics of the identification signal are configured by the processor, said characteristics comprising:
    intensity;
    duration;
    pattern;
    frequency; or
    modulation.

17. The device of claim 1 further comprising:
    a processor which receives an input through the user interface to place the device in detached mode and disables the identification signal while the device is detached from the substrate;
    a substrate allowing detachment of the device and re-attachment of the device for use with different placement, different clothing, re-use of uniforms, different missions or in different geographical locations.

18. The device of claim 1 further comprising:
    non-volatile memory attached to the processor which stores a number of configurations for the device;
    a processor which receives input from the user interface and makes one of the stored configurations for the device active based on said input.

19. The device of claim 18 wherein the processor makes changes to the configuration of the identification signal based on user input.

20. The device of claim 18 wherein the processor makes changes to the configuration of the device software based on user input.

21. The device of claim 1 wherein the processor is attached to an interface to an external individual combat system or external computer device, said interface comprising:
    user input interface;
    power interface;
    configuration interface;
    operational interface;
    test and diagnostics interface;
    software upgrade interface;
    firmware upgrade interface; or
    data transfer interface.

22. The device of claim 1 wherein the substrate allows attachment to non-clothing items or equipment that is worn or carried by an individual user.

23. The device of claim 1 wherein the device is assembled with discrete components comprising:
    the processor function which is performed by a microprocessor-based component;
    components emitting the identification signal which are separate from the other device components;
    a separate battery for a power source;
    a separate user input device.

24. The device of claim 1 wherein the processor is implemented using alternative processor technologies comprising:
    Programmable Logic Device;
    Field Programmable Gated Array;
    Application Specific Integrated Circuit.

25. The device of claim 1 wherein the user interface is an input technology that supports a miniature device, said input technology comprising:
    a user interface integrated on the same structure as the processor and identification signal;
    a user interface integrated in the same package as the processor and identification signal;
    a user interface which conforms to the surface of the device;
    a digital interface to an external user input device;
    a digital interface to an external system which provides user input;
    an interface based on wireless communications with an external user interface.

26. The device of claim 1 wherein the power source is low power source comprising:
    a Micro-Electromechanical System generator;
    a thermoelectric energy harvester;
    a piezoelectric energy harvester.

27. A method of identifying an authorized personnel comprising:
    attaching a tamper-proof identification device to a person;
    entering, by the person, the pass code and verifying the pass code;
    determining if the elapsed time after verification of the pass code has not exceeded a predetermined time;
    transmitting the identification signal from the device if the entered pass code is verified by the processor and determined to be valid and the elapsed time determined by the timer has not exceeded a predetermined time, and the tamper-proof detection has not detected tampering;
    receiving the transmitted signal from the device; and
    identifying the person as authorized personnel if the received signal is determined to be valid.

28. A method of identifying unauthorized personnel comprising:
    donning, by an unauthorized person, of clothing in which a tamper-proof identification device is attached;
    disabling the identification signal when the device determines that the elapsed time after verification of the pass code has exceeded a predetermined time;
    challenging the unauthorized person to generate an identification signal; and
    identifying the person as unauthorized personnel after the clothing of the person fails to generate an identification signal.

29. The identification method of claim 28 wherein the disabling step is accomplished by the device detecting tampering.

30. The identification method of claim 28 wherein the disabling step also displays an alert signal and the identifying step uses the alert signal to identify the person as unauthorized personnel.

31. The identification method of claim 28 wherein the challenging step is accomplished by an interrogation signal aimed at a reflective surface which is part of the device worn by the person.

32. The identification method of claim 31 wherein the disabling step uses an electronically-controlled material over the reflective surface to prevent the generation of an identification signal when the interrogation signal is aimed at it.

33. A method of identifying an authorized personnel comprising:
   attaching a tamper-proof identification device to a person;
   entering, by the person, the pass code and verifying the pass code;
   determining if the elapsed time after verification of the pass code has not exceeded a predetermined time;
   challenging the person using an interrogation signal;
   transmitting, from the device, an identification signal which is generated after the device receives the interrogation signal if the entered pass code is verified by the processor and determined to be valid and the elapsed time determined by the timer has not exceeded a predetermined time, and the tamper-proof detection has not detected tampering;
   receiving the transmitted signal from the device; and
   identifying the person as authorized personnel if the received signal is determined to be valid.

34. The identification method of claim 33 wherein the transmitting step uses reflection from a reflective surface of the challenge signal for the identification signal.

35. The identification method of claim 27 wherein the transmitting step is accomplished using a non-visible identification signal and the identifying step is accomplished by an observer wearing tactical viewing equipment to detect the identification signal.

36. The identification method of claim 28 wherein the donning step is accomplished after the unauthorized person takes the device from an authorized source.

37. The identification method of claim 27 which is accomplished when the person is mounted on or riding in a vehicle.

38. The device of claim 1 wherein the number of failed attempts to authenticate the user's pass code used by the tamper-proof detection is a predetermined number.

39. An identification system using the tamper-proof identification device of claim 1 comprising:
   an interface which connects to the device and disables the identification signal at the point of manufacture prior to shipping;
   a supply channel which ships the device with the identification signal disabled;
   an alert signal which is displayed by the device while the identification signal is disabled;
   pass code protection on the device which requires authentication before the identification signal can be enabled by the device;
   an authorized user who enters a preassigned pass code after receipt of the device, which enables the identification signal and disables the alert signal;
   tamper-proof protection which disables the identification signal if tampering is detected;
   a security force which uses the device identification signal or alerts to identify authorized and unauthorized personnel.

* * * * *